US010924911B2

(12) United States Patent
Gurram et al.

(10) Patent No.: US 10,924,911 B2
(45) Date of Patent: Feb. 16, 2021

(54) METHOD AND APPARATUS FOR INTER-CLUSTER DATA TRANSMISSION AND RECEPTION

(71) Applicant: Samsung Electronics Co., Ltd., Gyeonggi-do (KR)

(72) Inventors: Lokesh Gurram, Seoul (KR); Min-Gyu Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/994,522

(22) Filed: May 31, 2018

(65) Prior Publication Data

US 2018/0352413 A1    Dec. 6, 2018

(30) Foreign Application Priority Data

Jun. 1, 2017 (IN) .............................. 201711019296
May 16, 2018 (KR) .......................... 10-2018-0056004

(51) Int. Cl.
*H04W 8/00* (2009.01)
*H04L 29/08* (2006.01)
(Continued)

(52) U.S. Cl.
CPC ......... *H04W 8/005* (2013.01); *H04L 67/1061* (2013.01); *H04L 67/16* (2013.01); *H04W 48/16* (2013.01); *H04W 84/18* (2013.01)

(58) Field of Classification Search
CPC ..... H04W 8/005; H04W 48/16; H04W 84/18; H04W 72/121; H04W 74/006;
(Continued)

(56) References Cited

U.S. PATENT DOCUMENTS

2015/0030011 A1* 1/2015 Liu .......................... H04J 3/16
370/336
2015/0081840 A1 3/2015 Patil et al.
(Continued)

FOREIGN PATENT DOCUMENTS

WO    WO 2016/171527           10/2016
WO    WO-2016171527 A1 * 10/2016 ............ H04W 8/005
(Continued)

OTHER PUBLICATIONS

International Search Report dated Aug. 31, 2018 issued in counterpart application No. PCT/KR2018/006160, 9 pages.
(Continued)

*Primary Examiner* — Hardikkumar D Patel
(74) *Attorney, Agent, or Firm* — The Farrell Law Firm, P.C.

(57) ABSTRACT

A method for transmitting and receiving data between a first cluster and a second cluster by a first device of the first cluster, the first device, and a second device are provided. The method includes notifying a second device of the second cluster of a presence of the first device through a discovery beacon, transmitting information about a service that the first device provides to the second device, receiving a data path setup request from the second device that updates a channel active period to be equal to a channel active period of the first device based on the discovery beacon, and transmitting a data path setup response to the second device in response to the data path setup request, wherein a data path is established between the first device and the second device and is used to transmit or receive data to/from the second device.

20 Claims, 20 Drawing Sheets

(51) Int. Cl.
*H04W 48/16* (2009.01)
*H04W 84/18* (2009.01)

(58) Field of Classification Search
CPC ......... H04W 4/70; H04W 76/50; H04W 4/90;
H04W 8/22; H04W 24/08; H04W 4/06;
H04L 67/1061; H04L 67/16; H04L
1/1887; H04L 1/1893; H04L 1/08; H04L
5/0055; H04L 65/80; H04L 65/4076;
H04L 63/1408; H04L 69/16; H04L
61/2007; H04L 27/2602; H04L 1/0058;
H04L 27/2627; H04L 27/2613; H04L
1/0047; H04L 1/0042; H04L 1/0057;
H04L 1/0071; H04L 27/2628; H04L
27/265; H04L 5/0048; H04L 1/0072;
H04J 3/16; H04N 21/2362; H04N
21/2383; H04N 21/6332; H04N 21/8586;
H04N 21/2343; H04N 21/234; H04N
21/64322; H04N 21/236; H04H 60/07;
H04H 60/73; H03M 13/156; H03M
13/6519
See application file for complete search history.

(56) References Cited

U.S. PATENT DOCUMENTS

| | | |
|---|---|---|
| 2016/0014669 A1 | 1/2016 | Patil et al. |
| 2016/0165653 A1 | 6/2016 | Liu et al. |
| 2017/0055305 A1 | 2/2017 | Kurian et al. |
| 2017/0094554 A1 | 3/2017 | Liu et al. |
| 2017/0208608 A1* | 7/2017 | Sawada ............... H04W 72/121 |
| 2018/0098211 A1 | 4/2018 | Park et al. |

FOREIGN PATENT DOCUMENTS

| | | | |
|---|---|---|---|
| WO | WO 2017/043905 | 3/2017 | |
| WO | WO-2017043905 A1 * | 3/2017 | ............ H04W 84/18 |
| WO | WO 2017/057988 | 4/2017 | |
| WO | WO-2017057988 A1 * | 4/2017 | ............ H04W 40/32 |
| WO | WO-2017057988 A1 * | 4/2017 | ............ H04W 40/32 |

OTHER PUBLICATIONS

WiFi Alliance, "Neighbor Awareness Networking Technical Specification", Version 1.0, XP 055258740, May 1, 2015, 98 pages.
European Search Report dated Mar. 12, 2020 issued in counterpart application No. 18809113.6-1212, 12 pages.

* cited by examiner

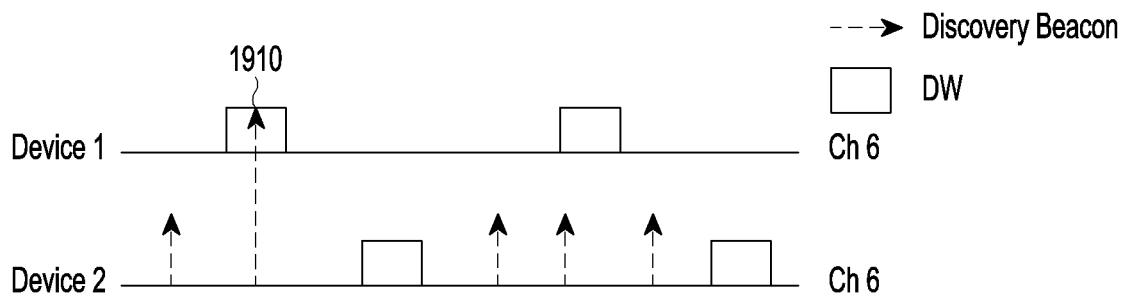
FIG.19A
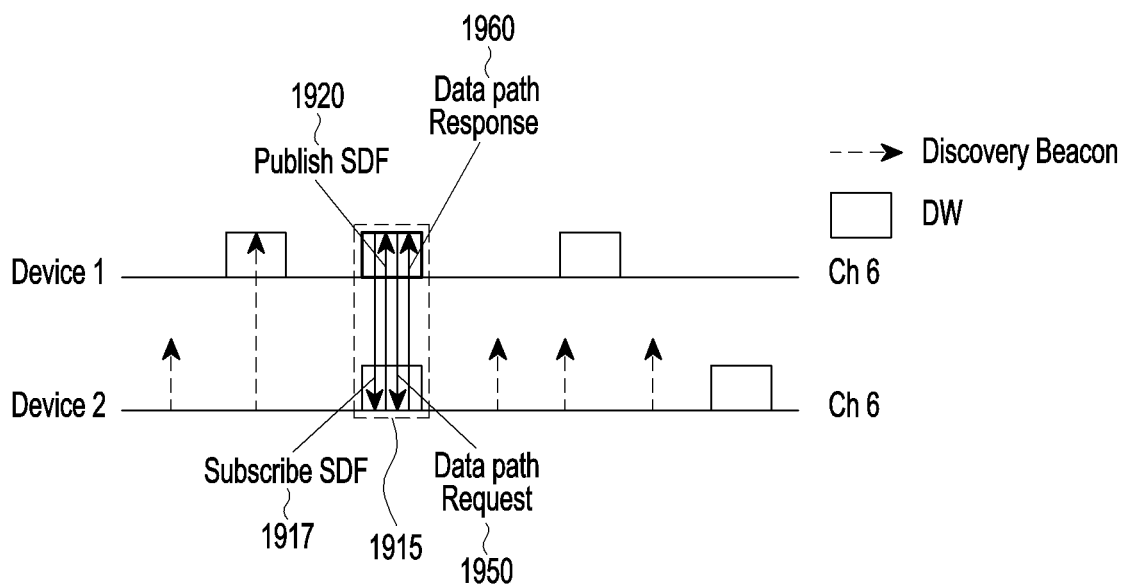
FIG.19B
FIG.19C

METHOD AND APPARATUS FOR INTER-CLUSTER DATA TRANSMISSION AND RECEPTION

CROSS-REFERENCE TO RELATED APPLICATION(S)

This application is based on and claims priority under 35 U.S.C. § 119 to Indian Provisional Patent Application Serial No. 201711019296 (PS), filed on Jun. 1, 2017, in the Indian Patent Office, and to Korean Patent Application Serial No. 10-2018-0056004, filed on May 16, 2018, in the Korean Intellectual Property Office, the disclosure of each of which is incorporated by reference herein in its entirety.

BACKGROUND

Field

The disclosure relates generally to methods and apparatuses for transmitting data between clusters based on a neighbor aware network (NAN) mesh and, more particularly, to a method and an apparatus for establishing a mesh data path by updating a channel active period for NAN devices of different clusters based on a discovery beacon.

Description of Related Art

NAN mesh refers to peer-to-peer (P2P) medium access control technology for effective service discovery and communication among neighbor devices, forming a network where neighbor devices are enmeshed. Where two devices do not overlap in communication coverage, another device involves forming a NAN mesh among the devices, enabling all the devices to communicate with each other.

Conventional communication among devices of the same cluster is multi-hop communication, but there exists no interface capable of transmission of data from a cluster to another cluster.

Thus, a need exists for an inter-cluster data transmission method.

SUMMARY

In accordance with an aspect of the present disclosure, a method and an apparatus are provided for establishing a mesh data path by updating a channel active period for NAN devices of different clusters based on a discovery beacon.

In accordance with another aspect of the present disclosure, a method and an apparatus are provided for notifying that mesh peering is possible through a discovery beacon.

In accordance with another aspect of the present disclosure, a method and an apparatus are provided for establishing a mesh data path by updating mesh parameters between NAN devices of different clusters.

In accordance with another aspect of the present disclosure, a method and an apparatus are provided for indicating whether there is a cluster proxy role in a subscribe service discovery frame (SDF) and a publish SDF.

In accordance with another aspect of the present disclosure, a method and an apparatus are provided for restricting a range of service discovery and a range of SDF propagation.

In accordance with another aspect of the present disclosure, a method and an apparatus are provided for unicasting or multicasting data between clusters.

In accordance with another aspect of the present disclosure, a method and an apparatus are provided for transmitting data between clusters considering mobility of a cluster proxy device.

In accordance with another aspect of the present disclosure, a method and an apparatus are provided for selecting a representative cluster proxy device to transmit data between clusters.

According to an embodiment of the present disclosure, a method for transmitting and receiving data between a first cluster and a second cluster by a first device of the first cluster is provided. The method includes notifying a second device of the second cluster of a presence of the first device through a discovery beacon, transmitting information about a service that the first device provides to the second device, receiving a data path setup request from the second device that updates a channel active period to be equal to a channel active period of the first device based on the discovery beacon, and transmitting a data path setup response to the second device in response to the data path setup request, wherein a data path is established between the first device and the second device and is used to transmit or receive data to/from the second device.

According to an embodiment of the present disclosure, a method for transmitting and receiving data between a first cluster and a second cluster by a second device of the second cluster is provided. The method includes receiving a discovery beacon from the first device to identify a presence of a first device of the first cluster, updating a channel active period to be equal to a channel active period of the first device based on the discovery beacon, receiving information about a service that the first device provides from the first device, transmitting a data path setup request to the first device, and receiving a data path setup response from the second device in response to the data path setup request, wherein a data path is established between the first device and the second device and is used to transmit or receive data to/from the first device.

According to an embodiment of the present disclosure, a first device of a first cluster, wherein the first device is configured to transmit and receive data between the first cluster and a second cluster is provided. The first device includes a transceiver and a controller, wherein the transceiver is configured to notify a second device of the second cluster of a presence of the first device through a discovery beacon, transmit information about a service that the first device provides to the second device, receive a data path setup request from the second device that updates a channel active period to be equal to a channel active period of the first device based on the discovery beacon, and transmit a data path setup response to the second device in response to the data path setup request, wherein the controller is configured to establish a data path between the first device and the second device, and wherein the transceiver is further configured to transmit or receive data to/from the second device using the data path.

According to an embodiment of the present disclosure, a second device of a second cluster, wherein the second device is configured to transmit and receive data between a first cluster and the second cluster. The second device includes a controller and a transceiver, wherein the controller is configured to receive a discovery beacon from the first device to identify presence of the first device of the first cluster and update a channel active period to be equal to a channel active period of the first device based on the discovery beacon, wherein the transceiver is configured to receive, from the first device, information about a service that the first device provides, transmit a data path setup request to the first device, and receive a data path setup response from the second device in response to the data path setup request, wherein the controller is further configured to establish a data path between the first device and the second device, and wherein the transceiver is configured to transmit or receive data to/from the first device using the data path.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 19A, 19B, and 19C are illustrations of channels of NAN device 1 of cluster A and NAN device 2 of cluster B according to a second scheme according to an embodiment.

DETAILED DESCRIPTION

Figure 1:
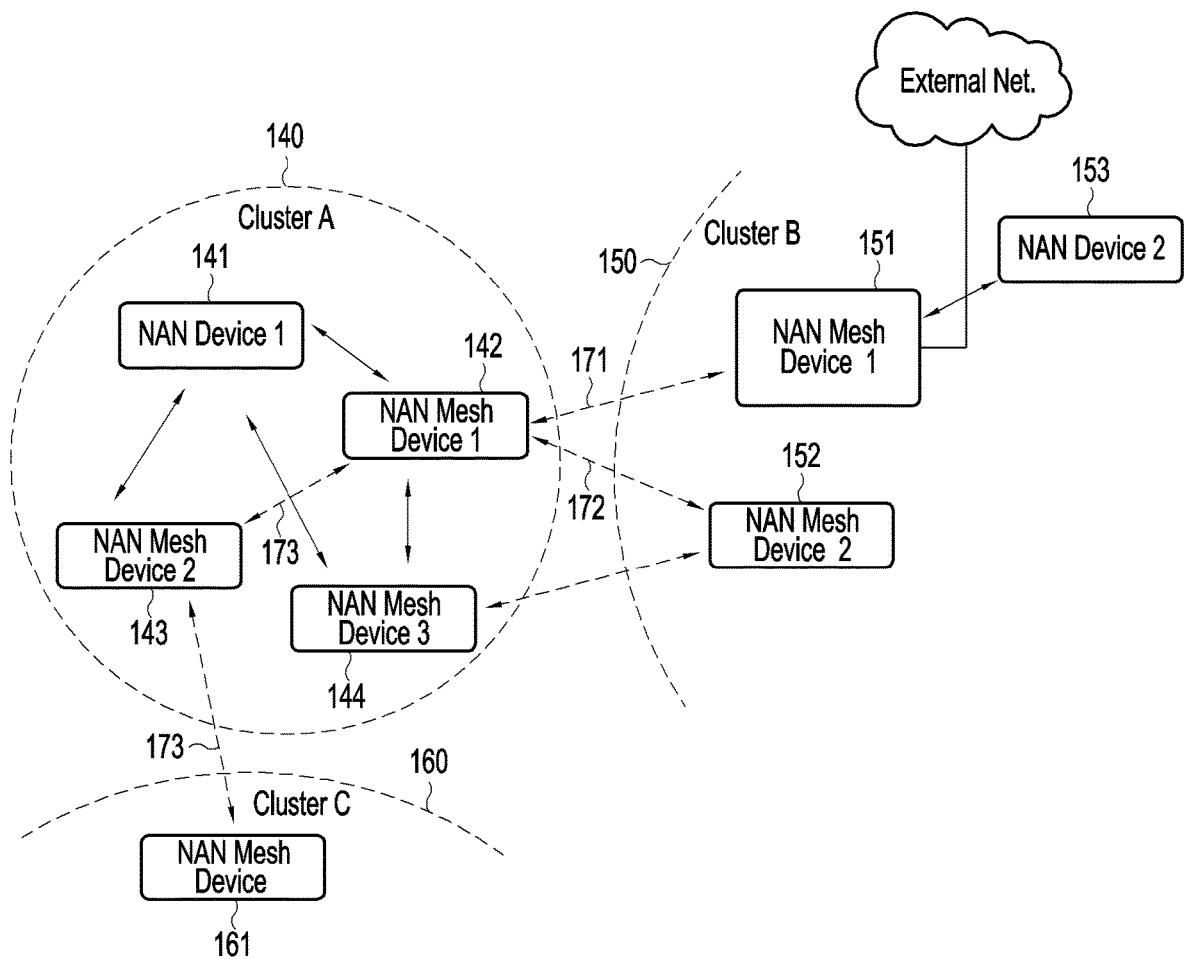
FIG. 1 is an illustration of a multi-cluster NAN mesh according to an embodiment.

Hereinafter, embodiments of the present disclosure are described in detail with reference to the accompanying drawings.

In describing the embodiments of the present disclosure, the description of technologies that are known in the art and are not directly related to the present disclosure is omitted. This is for further clarifying the gist of the disclosure without making it unclear.

Some elements may be exaggerated or schematically shown. The size of each element does not necessarily reflect the actual size of the element. The same reference numeral is used to refer to the same element throughout the accompanying drawings.

Advantages and features of the present disclosure, and methods for achieving the same may be understood through the embodiments described below, taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The scope of the present disclosure is defined only by the appended claims and their equivalents. The same reference numeral denotes the same element throughout the present disclosure.

The blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a certain manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, a segment, or a part of code including one or more executable instructions for executing a certain logical function(s). Further, it should also be noted that in some replacement execution examples, the functions described in the blocks may occur in different orders. For example, two blocks that are consecutively shown may be performed substantially simultaneously or in a reverse order depending on corresponding functions.

Herein, the term "unit" indicates a software element or a hardware element such as a field-programmable gate array (FPGA) or an application specific integrated circuit (ASIC). A "unit" plays a certain role. However, the term "unit" is not limited to indicating a software or a hardware element. A "unit" may be configured in a storage medium that may be addressed or may be configured to reproduce one or more processors. Accordingly, as an example, a "unit" includes elements, such as software elements, object-oriented software elements, class elements, and task elements, processes, functions, attributes, procedures, subroutines, segments of program code, drivers, firmware, microcode, circuits, data, databases, data architectures, tables, arrays, and variables. A function provided in an element or a "unit" may be combined with additional elements or may be split into sub elements or sub units. Further, an element or a "unit" may be implemented to reproduce one or more central processing units (CPUs) in a device or a security multimedia card.

Although the description of embodiments herein focuses primarily on orthogonal frequency division modulation (OFDM) based wireless communication systems, the subject matter of the present disclosure may also be applicable to other communication systems or services having similar technical backgrounds without departing from the scope of the present disclosure, which may be determined by one of ordinary skill in the art.

FIG. 1 is an illustration of a multi-cluster NAN mesh according to an embodiment.

Referring to FIG. 1, where NAN device 1 141 is outside the communication coverage of NAN device 2 153, NAN device 1 141 may communicate with NAN device 2 153 by forming a NAN mesh with intermediate nodes, e.g., NAN devices and/or NAN mesh devices.

The devices forming the NAN mesh form clusters. For example, NAN device 1 141, NAN mesh device 1 142, NAN mesh device 2 143, and NAN mesh device 3 144 may form cluster A 140. The NAN mesh network may have a plurality of clusters, e.g., cluster A 140, cluster B 150, and cluster C 160. In this case, NAN device 1 141 is a legacy NAN device that does not support any NAN mesh protocol, i.e., not forming a NAN mesh with other clusters. NAN mesh devices 1, 2, and 3 142, 143, and 144 are devices supporting a NAN mesh protocol, i.e., capable of forming a NAN mesh with other clusters.

The NAN devices and the NAN mesh devices form cluster A 140, cluster B 150, and cluster C 160 based on NAN mesh. The devices of the clusters may configure an inter-cluster NAN mesh by forming NAN mesh data paths 171, 172, and 173 for multi-hop communication. For example, NAN mesh device 1 142 of cluster A 140 may form a NAN mesh data path 171, and communicate with NAN mesh device 1 151 of cluster B 150. NAN mesh device 1 142 may form a NAN mesh data path 172, and communicate with, NAN mesh device 2 152 of cluster B 150. NAN mesh device 2 143 of cluster A 140 may form a NAN mesh data path 173, and communicate with the NAN mesh device 161 of cluster C 160. In this case, a NAN mesh data path 173 may stay formed between NAN mesh device 1 142 and NAN mesh device 2 143 of cluster A 140. Thus, despite no NAN mesh data path between cluster C 160 and cluster B 150, cluster C 160 and cluster B 150 may communicate with each other via the NAN data paths 171, 172, and 173 formed between the NAN mesh device 161 of cluster C 160, NAN mesh device 2 143, NAN mesh device 1 142 of cluster A 140, and the NAN mesh device 151 of cluster B 150.

In other words, NAN mesh data paths are formed between clusters, enabling inter-cluster data transmission, according to the present disclosure. According to the present disclosure, inter-cluster NAN mesh data paths are formed by NAN mesh peering.

Figure 2:
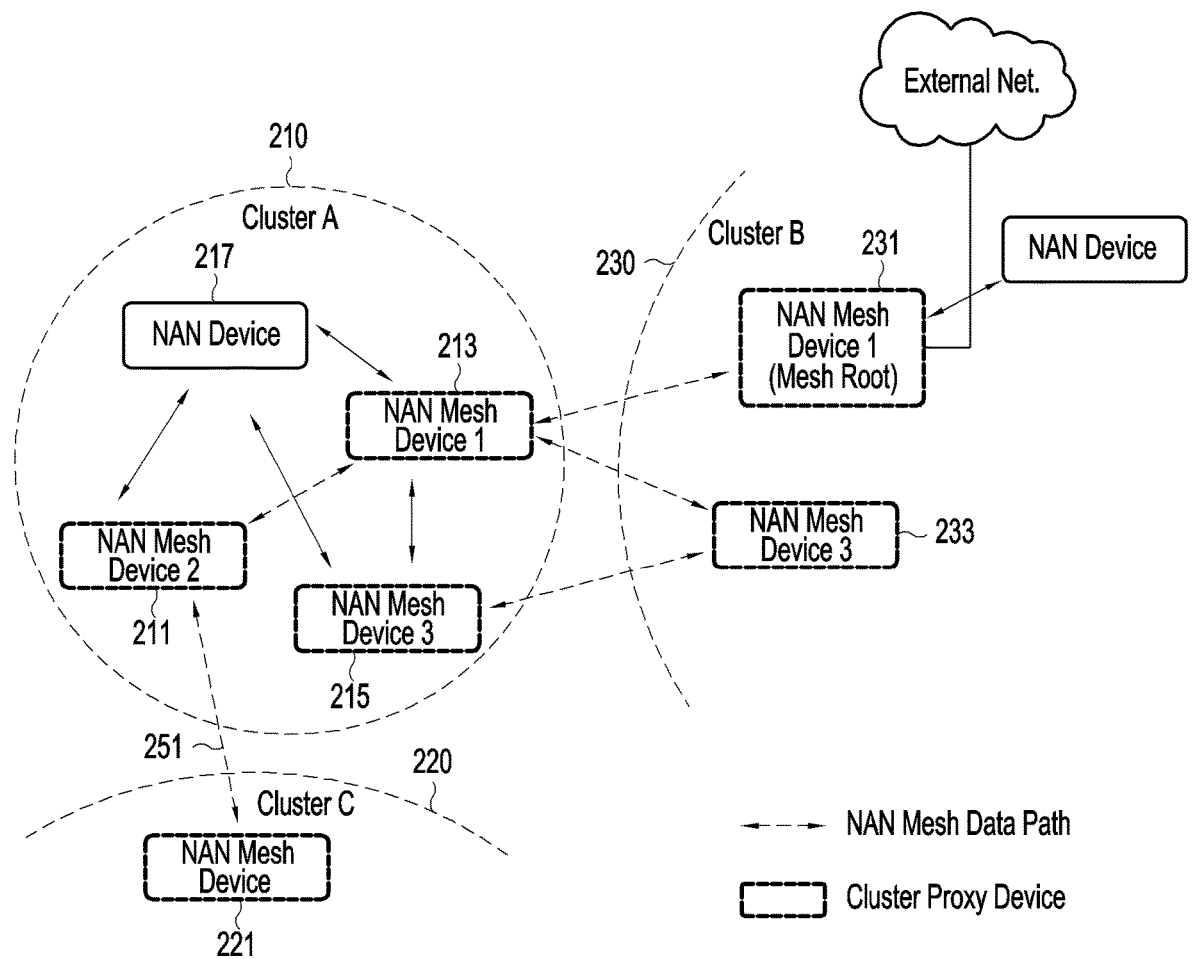
FIG. 2 is an illustration of a cluster proxy device on a NAN mesh network according to an embodiment.

FIG. 2 is an illustration of a cluster proxy device on a NAN mesh network according to an embodiment.

Referring to FIG. 2, NAN mesh devices that form NAN mesh data paths with NAN mesh devices of other clusters play a role as cluster proxies for the other clusters and are called cluster proxy devices.

For example, a NAN data path 251 is established between NAN mesh device 2 211 of cluster A 210 and NAN mesh device 221 of cluster C 220. The NAN mesh device 2 211 of cluster A 210 is a cluster proxy device that plays a role as a cluster proxy for cluster C 220.

One cluster may include several devices that function as cluster proxies.

For example, cluster A 210 includes NAN mesh device 1 213 that forms a NAN mesh data path with NAN mesh device 1 231 of cluster B 230 and NAN mesh device 3 215 that forms a NAN mesh data path with NAN mesh device 3 233 of cluster B 230. The NAN mesh device 1 213 and NAN mesh device 3 215 of cluster A 210 are cluster proxy devices for cluster B 230.

The NAN mesh device serving as a cluster proxy may transfer SDFs of the NAN mesh devices and NAN device to which it belongs to other clusters.

For example, NAN mesh device 1 213, which is a cluster proxy device of cluster A 210, may transfer SDFs of the NAN device 217, NAN mesh device 2 211, and/or NAN mesh device 3 215 of cluster A 210 may transfer SDFs of the NAN device 217 to cluster B 230.

Further, the NAN mesh device serving as a cluster proxy may receive, from a second cluster, SDFs of the NAN mesh devices of the second cluster and transfer the SDFs to the NAN mesh devices of its own cluster.

For example, NAN mesh device 1 213, which is a cluster proxy device of cluster A 210, receives SDFs from NAN mesh device 1 231 and/or NAN mesh device 3 233 of cluster B 230 and transfers the SDFs to the NAN device 217, NAN mesh device. 211, and NAN mesh device 215 of cluster A 210. Accordingly, the NAN device 217 and NAN mesh devices 211, 213, and 215 of cluster A 210 may receive service information, which is provided from another cluster, e.g., cluster B 230, from the NAN mesh device serving as a cluster proxy.

The NAN mesh device playing a role as a cluster proxy (cluster proxy NAN mesh device), the NAN mesh device not playing a role as a cluster proxy (non-cluster proxy NAN mesh device), and the legacy NAN device not forming a NAN mesh data path with a device of another cluster may be distinguished from each other by device type parameters as set forth in Table 1 below. The device type parameters may be contained in the publish SDF and/or subscribe SDF.

TABLE 1

| Device Type | Value |
| --- | --- |
| Legacy NAN device | 0 |
| Non-Cluster Proxy NAN Mesh device | 1 |
| Cluster Proxy NAN Mesh device | 2 |

The device type parameter 0 indicates that the device is a legacy NAN device that does not establish any NAN mesh data path with the device of the second cluster. The device type parameter 1 indicates that the device is a NAN mesh device that does not serve as a cluster proxy. The device type parameter 2 indicates that the device is a NAN mesh device that serves as a cluster proxy. As such, the device type parameter may have different values depending on device types, allowing the NAN mesh device receiving the device type parameter-containing SDF to be aware whether the SDF transmitting device plays a role as a cluster proxy.

Figure 3:
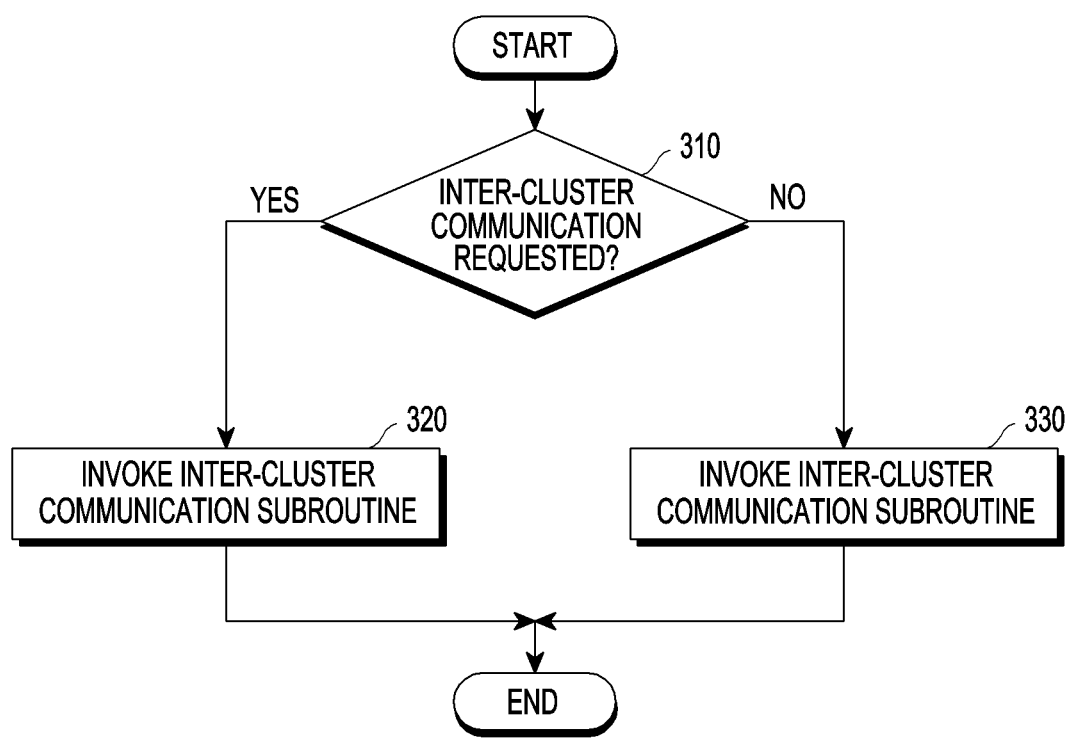
FIG. 3 is a flowchart of a communication routine as per whether there is an inter-cluster communication request according to an embodiment.

FIG. 3 is a flowchart of a communication routine as per whether there is an inter-cluster communication request according to an embodiment.

Referring to FIG. 3, a NAN device determines whether requested communication is inter-cluster communication at step 310.

Where the requested communication is inter-cluster communication, the NAN device invokes an inter-cluster communication subroutine at step 320.

Where the requested communication is not inter-cluster communication, the NAN device invokes an intra-cluster communication subroutine at step 330.

Figure 4:
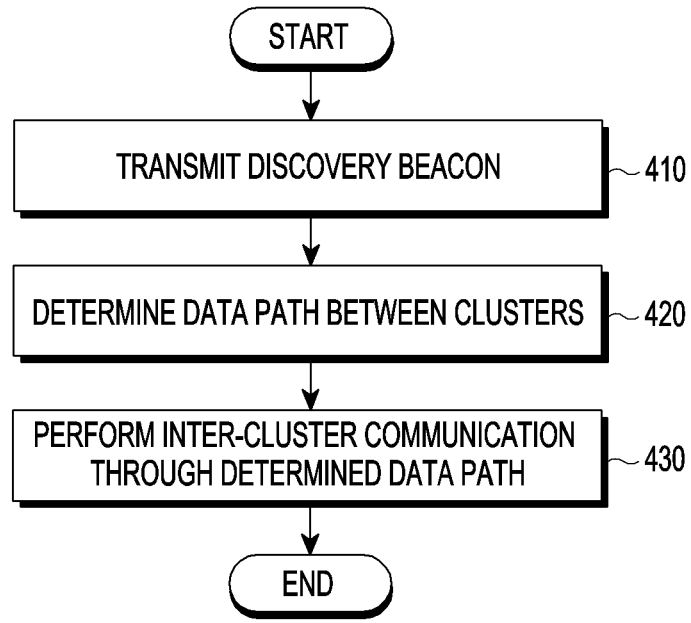
FIG. 4 is a flowchart of operations of a discovery beacon receiving device on inter-cluster communication according to an embodiment.

FIG. 4 is a flowchart of operations of a discovery beacon receiving device on inter-cluster communication according to an embodiment.

Referring to FIG. 4, a NAN device transmits a discovery beacon to a NAN device of a second cluster at step 410.

The NAN device determines an inter-cluster data path at step 420. In this case, the NAN device may transmit a publish SDF to the NAN device of the second cluster and receive a subscribe SDF from the NAN device of the second cluster. Further, the NAN device may receive a data path request from the NAN device of the second cluster and may, in response, transmit a data path response to the NAN device of the second cluster, thereby determining an inter-cluster data path.

The NAN device performs inter-cluster communication through the determined data path at step 430.

Figure 5:
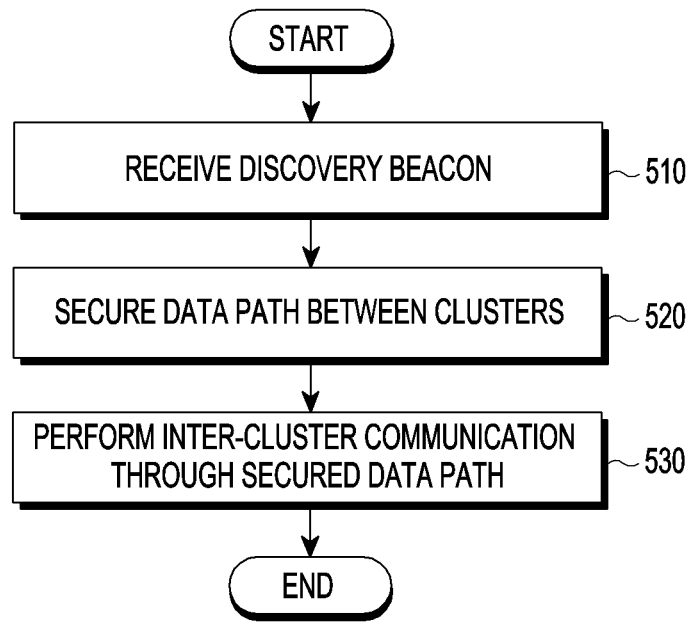
FIG. 5 is a flowchart of operations of a discovery beacon transmitting device on inter-cluster communication according to an embodiment.

FIG. 5 is a flowchart of operations of a discovery beacon transmitting device on inter-cluster communication according to an embodiment.

Referring to FIG. 5, a NAN device receives a discovery beacon at step 510.

The NAN device secures an inter-cluster data path at step 520. In this case, the NAN device may receive a publish SDF from a NAN device of the second cluster and transmit a subscribe SDF to the NAN device of the second cluster. The NAN device may transmit a data path request to the NAN device of the second cluster, and, in response, receive a data path response, securing an inter-cluster data path.

The NAN device performs inter-cluster communication through the secured data path at step 530.

Figure 6:
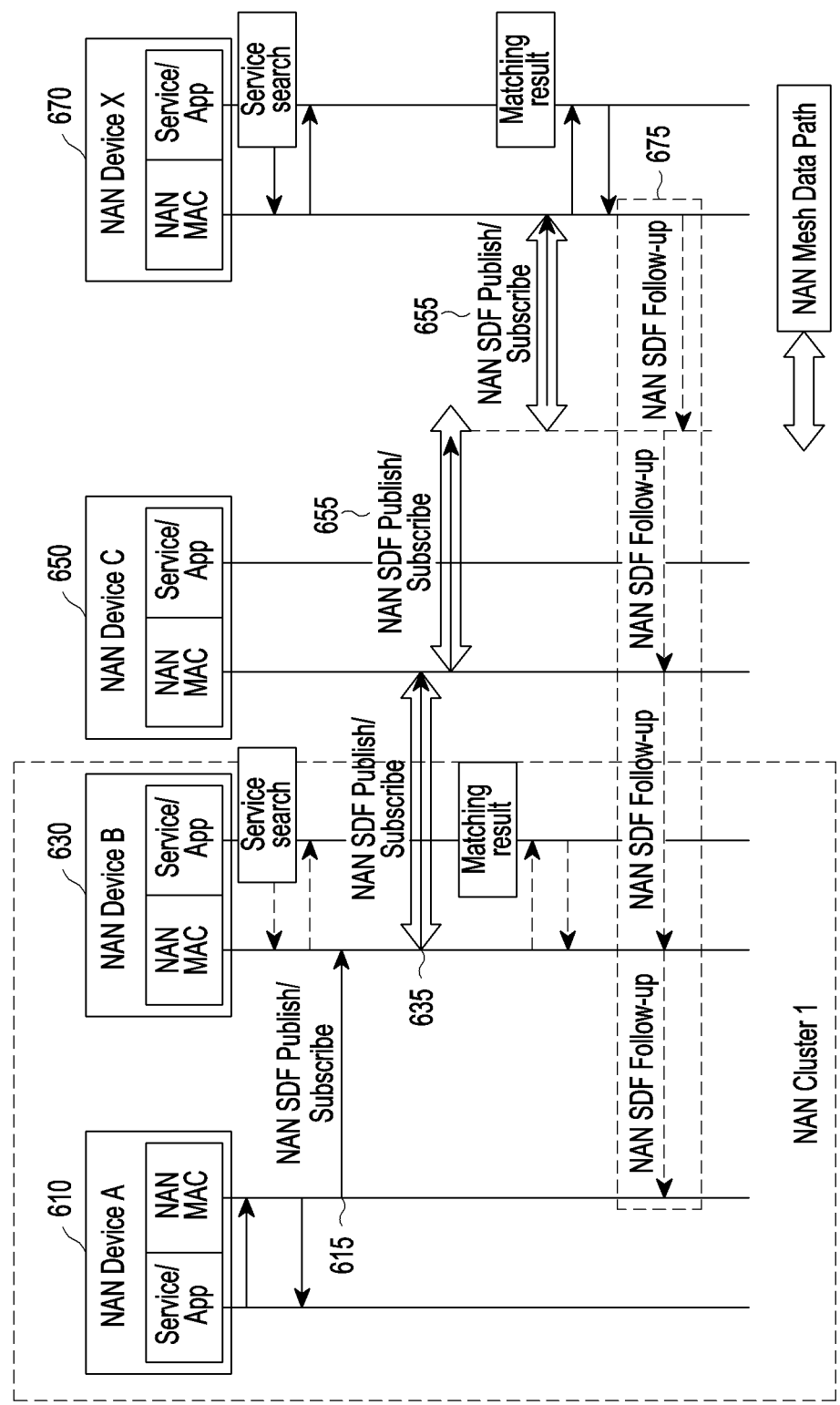
FIG. 6 is a flow diagram of inter-cluster service discover messages according to an embodiment.

FIG. 6 is a flow diagram of inter-cluster service discovery messages according to an embodiment. Inter-cluster service discovery indicates discovering a service between devices of different clusters.

Referring to FIG. 6, NAN device A 610 and NAN device B 630 belong to NAN cluster 1. NAN device A 610 and NAN device B 630 may propagate publish SDFs and/or subscribe SDFs to NAN devices of different clusters. Conversely, NAN device A 610 and NAN device B 630 may receive SDFs from the NAN devices of cluster 1 or may receive SDFs from the NAN devices of different clusters.

Propagating and receiving SDFs may be intended for discovering a service that is offered to the devices in the NAN mesh network formed with a plurality of clusters and for discovering an inter-device data transfer path, i.e., a mesh data path, and requesting or providing a service through the discovered mesh data path in the future.

For example, NAN device A 610 transmits an SDF to NAN device B 630 of the same cluster to propagate SDFs at step 615. NAN device B 630 may transmit the SDF of NAN device A 610 to NAN device C 650 via the cluster proxy device that forms a mesh data path with NAN device C 650 of cluster 2 at step 635. The SDF of NAN device A 610 transferred to NAN device C 650 may be transmitted to NAN device X 670 through the mesh data paths set up between NAN device C 650 and NAN device X 670 at step 655. Thus, NAN device X 670 may be aware what service NAN device A 610 offers based on the SDF of NAN device A 610 received through several mesh data paths and may transfer a follow-up message to NAN device A 610 through the mesh data paths and receive a service from NAN device A 610 at step 675. In this case, service-related data corresponding to the service of NAN device A 610 may propagate through the mesh data paths.

NAN device C 630 and NAN device X 670 may belong to different clusters, and a plurality of clusters may be present between NAN device C 630 and NAN device X 670.

Where the NAN device receiving the SDF is a cluster proxy device, the mesh data path may be updated, and SDFs and/or service-related data may propagate to the NAN device of a different cluster via the updated mesh data path. For example, NAN device B 630 which is a cluster proxy device may update the mesh data path to NAN device X 670.

Where the NAN device receiving the SDF is not a cluster proxy device but forms a mesh data path with a cluster proxy device, the NAN device may update the mesh data path and propagate SDFs and/or service-related data to the cluster proxy device. Accordingly, SDFs may propagate to other clusters via the cluster proxy device.

Where the NAN device receiving the SDF is not a cluster proxy device nor does it form a mesh data path with a cluster proxy device, the NAN device may not any longer propagate SDFs and/or service-related data to other clusters.

The SDF receiving NAN device may receive SDFs only within the same window between the SDF transmitting NAN device and the SDF receiving NAN device. Therefore, the SDF receiving NAN device must be scheduled to have the same discovery window as multiple NAN devices to receive SDFs which are transmitted to the multiple NAN devices, which, however, leads to an increase in the active period for the SDF receiving NAN device, causing the SDF receiving NAN device to consume power.

Even without scheduling the NAN device receiving SDFs from the multiple NAN devices to have the same discovery window as all of the multiple NAN devices, the publish SDF or subscribe SDF may be propagated by use of the mesh data path established between the clusters. That is, multiple publish SDFs or subscribe SDFs may be propagated without increasing the active period for the NAN device.

The transmission of SDFs may be restricted by an intra cluster (intra cluster) parameter and a maximum (max) hop (max hop) parameter. The intra cluster parameter and the max hop parameter are contained in the publish SDF or subscribe SDF, posing a limitation to providing service.

The intra cluster parameter is one-bit long. Where the intra cluster parameter is 1, requesting or providing a service that the NAN device offers on SDF propagation is restricted to be discovered only within the cluster where the NAN device belongs. In other words, where the intra cluster parameter is 1, service discovery is limited as occurring within the cluster where the NAN device belongs. Where the intra cluster parameter is 0, service discovery may occur over the entire NAN mesh network.

The intra cluster parameter may indicate the presence or absence of intra cluster service discovery for discovering service among the devices of the same cluster.

The max hop parameter is eight-bit long, indicating the maximum hop count possible between a service provider and a service subscriber.

The use of the intra cluster parameter and the max hop parameter may address the problem of exceeding the maximum SDF size due to accrued information about the mesh data path.

Figure 7:
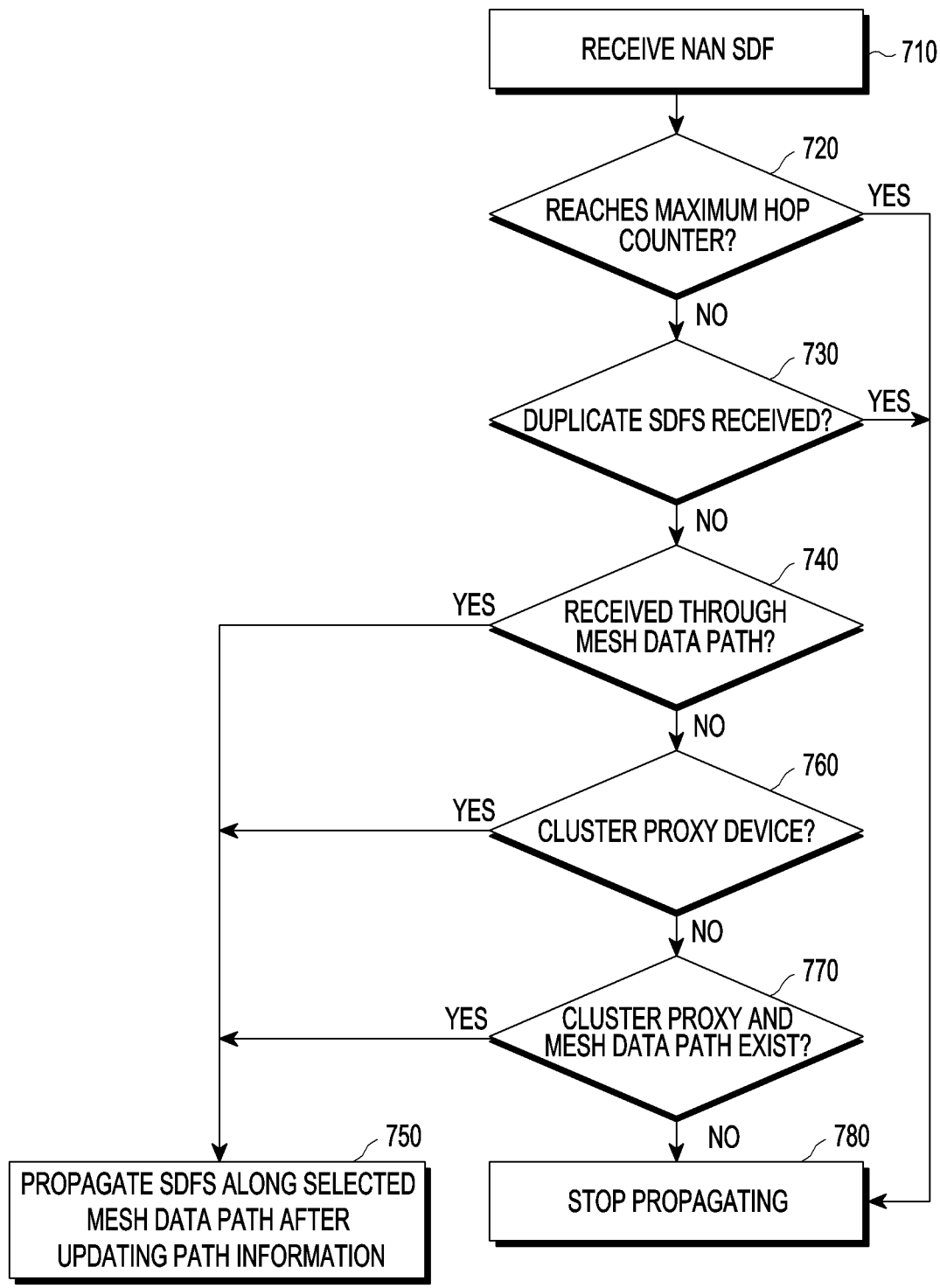
FIG. 7 is a flowchart of a process for propagating an SDF according to an embodiment.

FIG. 7 is a flowchart of a process for propagating an SDF according to an embodiment.

Referring to FIG. 7, a NAN device receives an SDF from a second NAN device at step 710. In this case, the received SDF may be a publish SDF or a subscribe SDF.

The NAN device determines whether the received SDF reaches the maximum hop count based on the max hop parameter contained in the received SDF at step 720. For example, the NAN device determines how many NAN devices the received SDF has passed through and compares the determined number of NAN devices with the max hop parameter, determining whether the received SDF reaches the maximum hop count.

Where the received SDF reaches the maximum hop count, the NAN device stops propagating the received SDF at step 790.

Unless the received SDF reaches the maximum hop count, the NAN device determines whether the received SDF is the same as an SDF previously received at step 730.

Where the received SDF is a duplicate of the prior SDF, the NAN device does not propagate the received SDF any longer at step 780.

Unless the received SDF is a duplicate of the prior SDF, the NAN device determines whether the SDF has been received through the mesh data path at step 740.

Where the SDF has been received through the mesh data path, the NAN device updates path information and propagates the SDF along the selected mesh data path at step 750.

In this case, the mesh data path is selected considering the mobility and power consumption of the cluster proxy device of the second cluster or the restriction of the propagation to being performed only within the cluster where the NAN device belongs (e.g., where the intra cluster parameter is 1). A configuration for selecting the mesh data path is described below in greater detail with reference to FIGS. 14 to 17C.

Unless the SDF has been received through the mesh data path, the NAN device determines whether it is a cluster proxy device at step 760.

Upon determining that the NAN device is a cluster proxy device, the NAN device updates path information and propagates the SDF along the selected mesh data path at step 750.

Unless the NAN device is determined to be a cluster proxy device, the NAN device determines whether there is a mesh data path with the cluster proxy device of the cluster where the NAN device belongs at step 770.

Where there is a mesh data path with the cluster proxy device of the cluster where the NAN device belongs, the NAN device updates path information and propagates the SDF along the selected mesh data path at step 760.

Unless there is a mesh data path with the cluster proxy device of the cluster where the NAN device belongs, the NAN device stops propagating the SDF at step 780.

Figure 8A:
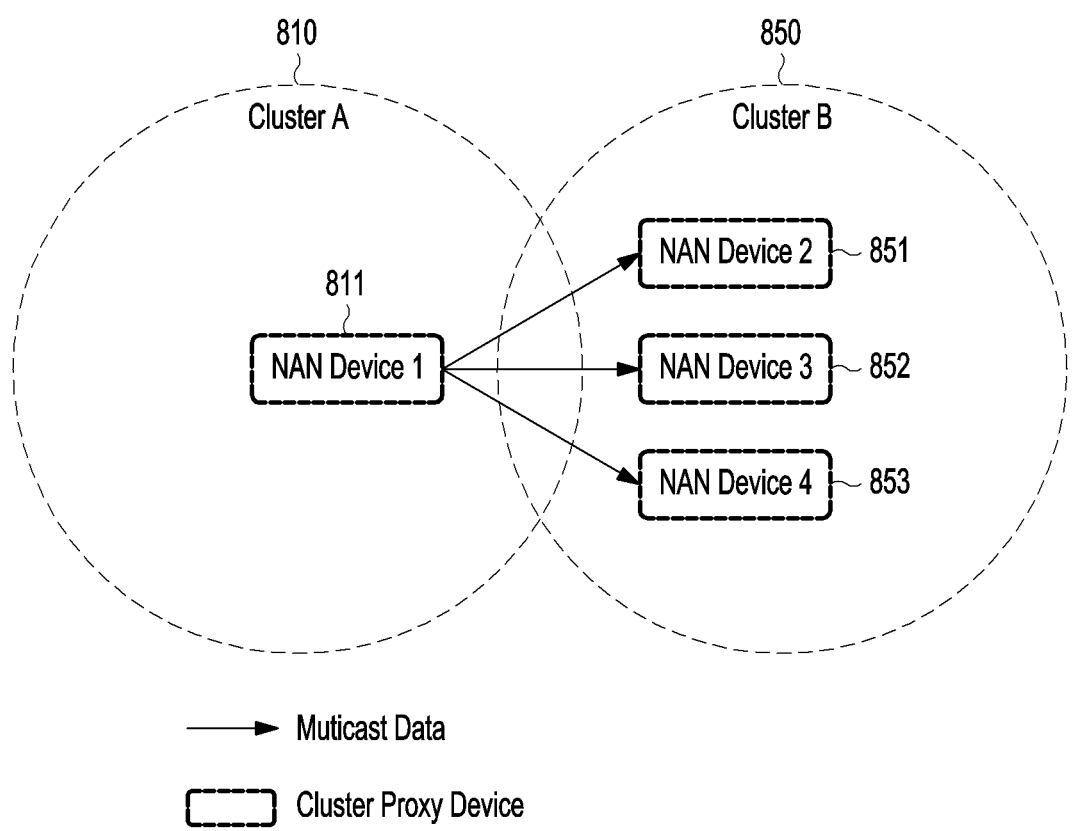
FIG. 8A is an illustration of a method for selecting a mesh data path for propagating an SDF according to an embodiment.
Figure 8B:
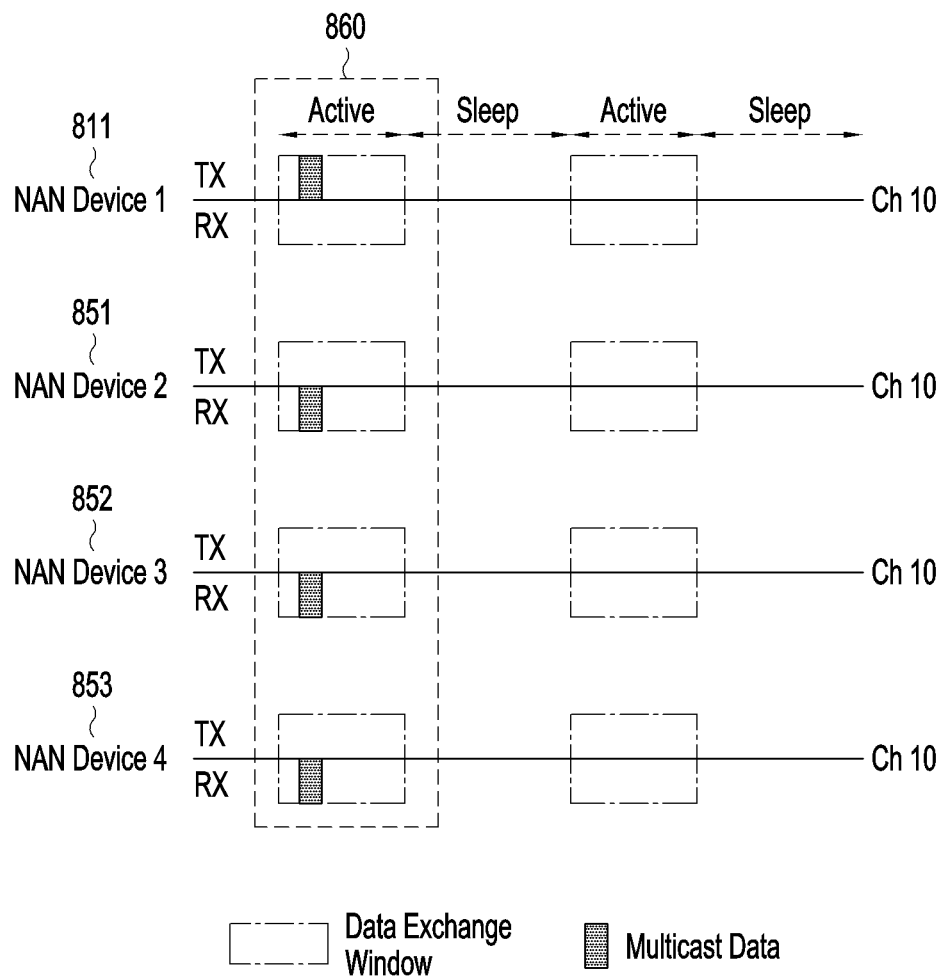
FIG. 8B is an illustration of a data exchange window for NAN devices according to an embodiment.

FIG. 8A is an illustration of a method for selecting a mesh data path for propagating an SDF according to an embodiment. FIG. 8B is a view illustrating a data exchange window for NAN devices according to an embodiment.

Referring to FIG. 8A, mesh data paths are established between NAN device 1 811 of cluster A 810 and each of NAN device 2 851, NAN device 3 852, and NAN device 4 853 of cluster B 850.

NAN device 1 811 of cluster A 810 may multicast service-related data to all of NAN device 2 851, NAN device 3 852, and NAN device 4 853 of cluster B 850. To transmit service-related data to all of NAN device 2 851, NAN device 3 852, and NAN device 4 853 of cluster B 850, NAN device 1 811 of cluster A 810 must be scheduled to have the same wireless channel active period as NAN device 2 851, NAN device 3 852, and NAN device 4 853 of cluster B 850.

Referring to FIG. 8B, channel 10s of NAN device 1 811, NAN device 2 851, NAN device 3 852, and NAN device 4 853 is a channel for transmission and reception of service-related data and is activated and deactivated at the same time. Accordingly, when NAN device 1 811 transmits service-related data during a first active period, i.e., data exchange window, of channel 10, NAN device 2 851, NAN device 3 852, and NAN device 4 853 may receive the service-related data during the respective first active periods of their channel 10s, i.e., multicast data 860.

NAN device 1 811 of cluster A 810 and NAN device 2 851, NAN device 3 852, and NAN device 4 853 of cluster B 850 may be scheduled to have the same wireless channel for data communication and the same active period, so that NAN device 1 811 of cluster A 810 may stably propagate service-related data even when at least one of NAN device 2 851, NAN device 3 852, and NAN device 4 853 of cluster B 850 is on the move.

Figure 9B:
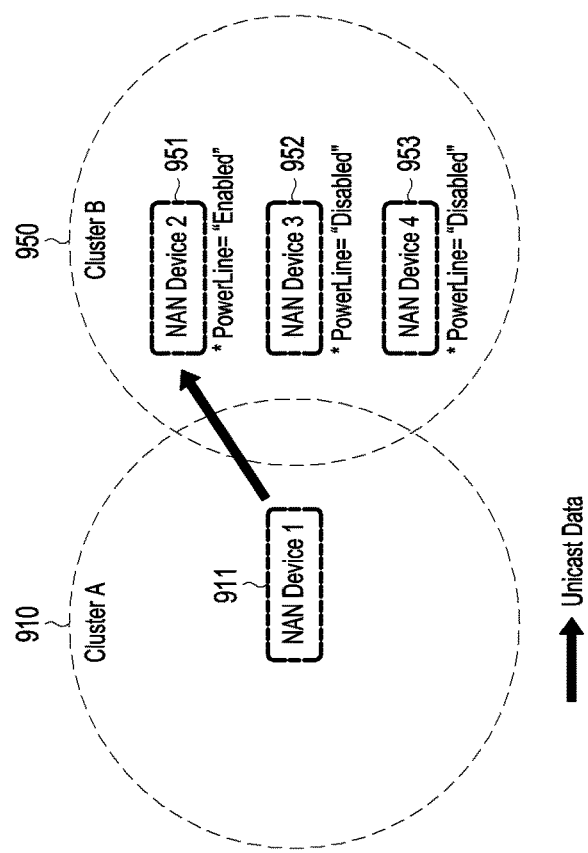
FIGS. 9A and 9B are illustrations of a method for selecting a mesh data path for propagating an SDF according to an embodiment.
Figure 9A:
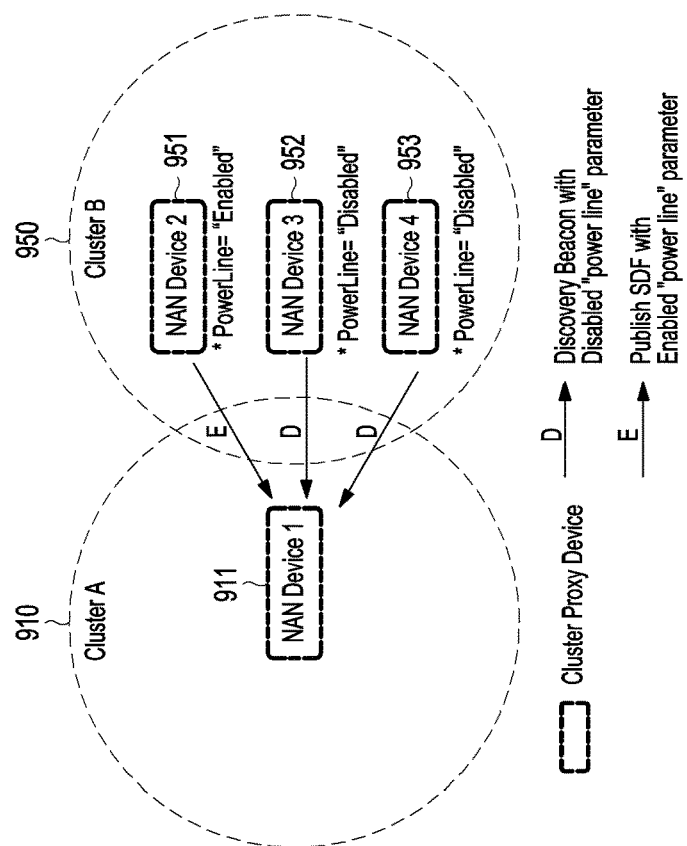

FIGS. 9A and 9B are illustrations of a method for selecting a mesh data path for propagating an SDF according to an embodiment.

Referring to FIG. 9A, NAN device 1 911, which is a cluster proxy device of cluster A 910, may select a NAN device that is not likely to move among the NAN devices, which are cluster proxy devices of cluster B 950, and propagate service-related data to cluster B 950. To select a NAN device not likely to move, NAN device 1 911 uses power line parameters of the NAN devices of cluster B 950. The power line parameter being "enabling" indicates that the NAN device is connected to the power line and has no chance of moving. The power line parameter being "disabling" indicates that the NAN device is not connected to the power line and has a chance of moving.

The NAN device whose power line parameter is "enabling" may be, e.g., a refrigerator or a TV, but is not limited thereto. The NAN device whose power line parameter is "disabling" may be, e.g., a Bluetooth speaker, but is not limited thereto.

The power line parameter may be contained in the device capability, and the device capability may be contained in the discovery beacon, SDF, or data frame.

For example, where NAN device 1 911 of cluster A 910 and NAN device 2 951 of cluster B 950 establish a mesh data path, NAN device 1 911 puts a power line parameter of "disabled" in a discovery beacon and transmits the discovery beacon to NAN device 2 951, and NAN device 2 951 may put a power line parameter of "enabled" in a publish SDF and transmit the publish SDF to NAN device 1 911. In other words, NAN device 1 911 may notify NAN device 2 951 that NAN device 1 911 is not connected to the power line and has a chance of moving, and NAN device 2 951 may notify NAN device 1 911 that NAN device 2 951 is connected to the power line and has no chance of moving.

NAN device 1 911, NAN device 3 952, and NAN device 4 953, when each establishes a mesh data path, may indicate whether they are connected to the power line by putting the power line parameter in the discovery beacon and publish SDF. In this case, NAN device 1 911 may steadily exchange the power line parameter-containing capability with NAN device 2 951, NAN device 3 952, and NAN device 4 953.

Referring to FIG. 9B, where NAN device 1 911 of cluster A 910 propagates service-related data to cluster B 950, NAN device 1 911 selects NAN device 2 951 whose power line parameter is enabled from cluster B 950 and unicasts data.

Where there are no or multiple devices whose power line parameters are enabled, a cluster proxy device may be selected to propagate data as per a third or fourth embodiment of the present disclosure. The third and fourth embodiments of the present disclosure are described below in greater detail with reference to FIGS. 10A, 10B, 11A, and 11B.

Figure 10A:
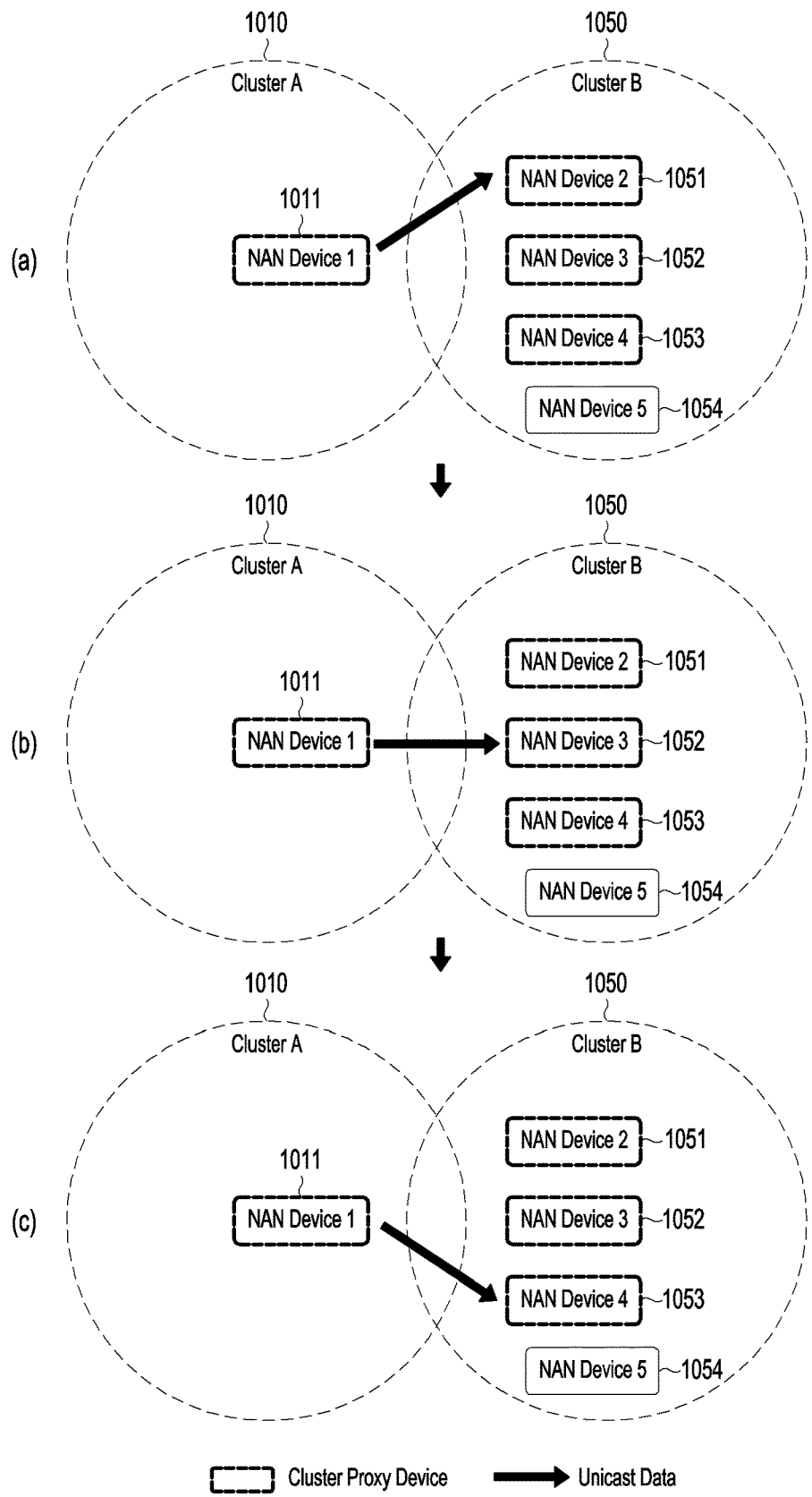
FIG. 10A is an illustration of a method for selecting a mesh data path for propagating an SDF according to an embodiment.
Figure 10B:
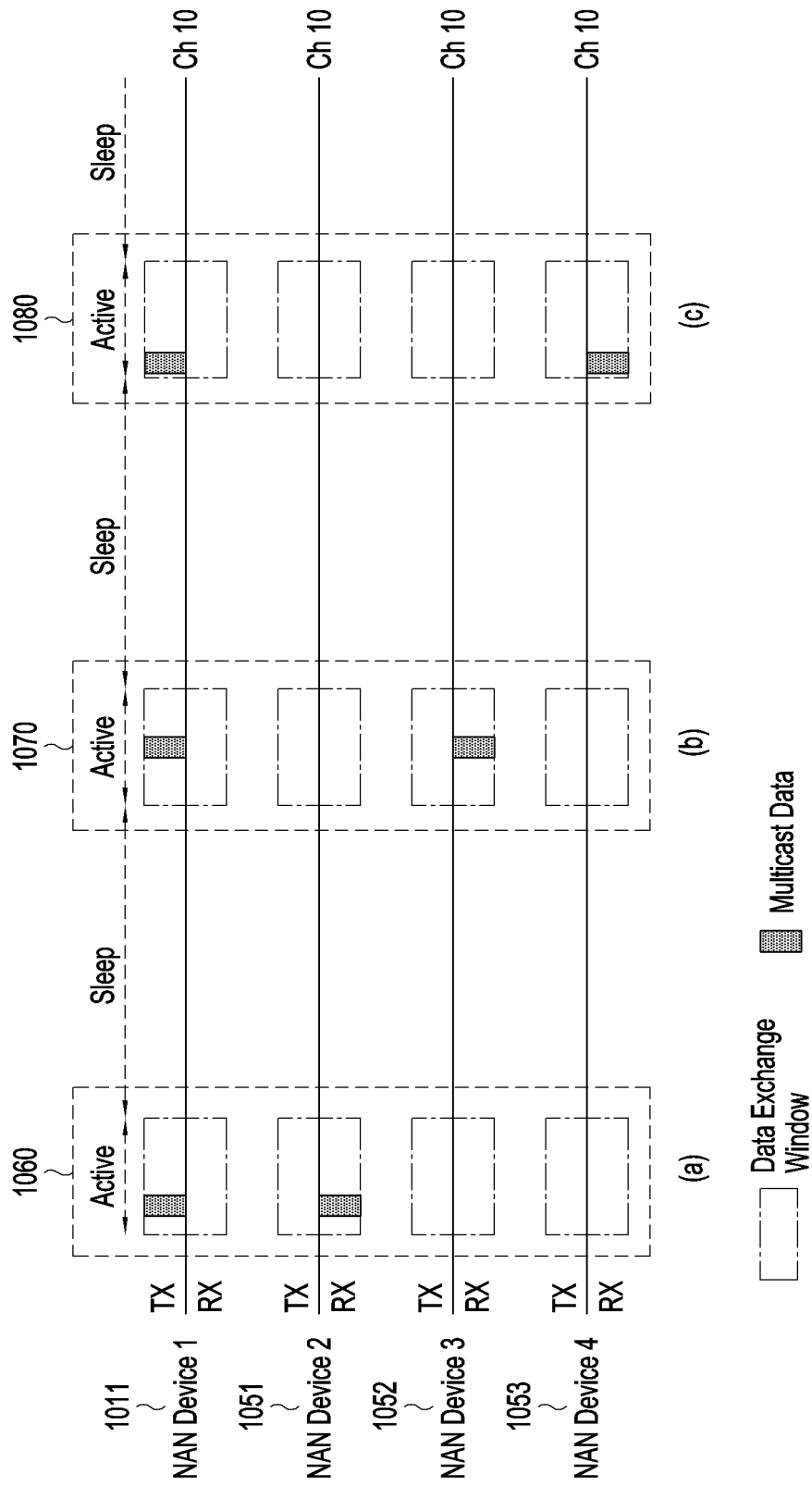
FIG. 10B is an illustration of a data exchange window for NAN devices according to an embodiment.

FIG. 10A is an illustration of a method for selecting a mesh data path for propagating an SDF according to a third embodiment. FIG. 10B is an illustration of a data exchange window for NAN devices according to the third embodiment.

Referring to FIG. 10A, panel (a), NAN device 1 1011, which is a cluster proxy device of cluster A 1010—in order to propagate service-related data to cluster B 1050—may sequentially select NAN devices, which are cluster proxy devices of cluster B 1050, as a representative cluster proxy device of cluster B 1050 as per a round-robin scheme. The round-robin scheme indicates determining an order of operating all the devices without setting priority. For example, NAN device 1 1011 of cluster A 1010 may select the representative cluster proxy device of cluster B 1050 in the order of NAN device 2 1051, NAN device 3 1052, NAN device 4 1053, and NAN device 2 1051 as per the round-robin scheme. In this case, NAN device 1 1011 of cluster A 1010 remains forming mesh data paths with the NAN devices 1051, 1052, 1053, and 1054 which are cluster proxy devices of cluster B 1050.

The reason for sequentially selecting the NAN devices 1051, 1052, and 1053, which are cluster proxy devices of cluster B 1050, as the representative cluster proxy device of cluster B 1050, is to lead to even power consumption of the NAN devices 1051, 1052, 1053, and 1054 which are cluster proxy devices of cluster B. NAN device 1 1011 of cluster A 1010 may classify the cluster proxy devices of cluster B 1050 using cluster identifiers (IDs) to lead to even power consumption. For example, NAN device 1 1011 of cluster A 1010 uses the cluster ID of cluster B 1050 to only filter in the cluster proxy devices of cluster B. NAN device 1 1011 of cluster A 1010 may connect to the cluster proxy device of other cluster as well as cluster B 1050. However, the device type parameter alone may not indicate which cluster the cluster proxy device belongs. Thus, a need exists to classify the cluster proxy devices of different clusters using the cluster IDs.

Accordingly, NAN device 1 1011 of cluster A 1010 selects NAN device 2 1051, NAN device 3 1052, and NAN device 4 1053, which are cluster proxy devices of cluster B 1050, as the representative cluster proxy device evenly and as per the round-robin scheme and transmit service-related data. NAN device 5 1054 is not a cluster proxy device and is thus not selected as the representative cluster proxy device.

For example, NAN device 1 1011 of cluster A 1010 sets NAN device 2 1051 of cluster B 1050 as the representative cluster proxy device of cluster B 1050 and unicasts service-related data to NAN device 2 1051.

Referring to FIG. 10B, panel (a), NAN device 1 1011 of cluster A 1010 unicasts service-related data to NAN device 2 of cluster B 1050 within a data exchange window which is the first active period 1060.

Referring to FIG. 10A, panel (b), where NAN device 1 1011 of cluster A 1010 sets NAN device 2 1051 of cluster B 1050 as the representative cluster proxy device of cluster B and then propagates service-related data to cluster B 1050, NAN device 1 1011 of cluster A 1010 sets NAN device 3 1052 of cluster B 1050 as the representative cluster proxy device of cluster B 1050 and unicasts service-related data to NAN device 3 1052.

Referring to FIG. 10(b), panel (b), NAN device 1 1011 of cluster A 1010 unicasts service-related data to NAN device 3 1052 of cluster B 1050 within a data exchange window which is the second active period 1070.

Referring to FIG. 10A, panel (c), where NAN device 1 1011 of cluster A 1010 sets NAN device 3 1052 of cluster B 1050 as the representative cluster proxy device of cluster B 1050 and then propagates service-related data to cluster B 1052, NAN device 1 1011 of cluster A 1010 sets NAN device 4 1053 of cluster B 1050 as the representative cluster proxy device of cluster B 1050 and unicasts service-related data to NAN device 4 1053.

Referring to FIG. 10B, panel (c), NAN device 1 1011 of cluster A 1010 unicasts service-related data to NAN device 4 1053 of cluster B within a data exchange window which is the third active period 1080.

Figure 11B:
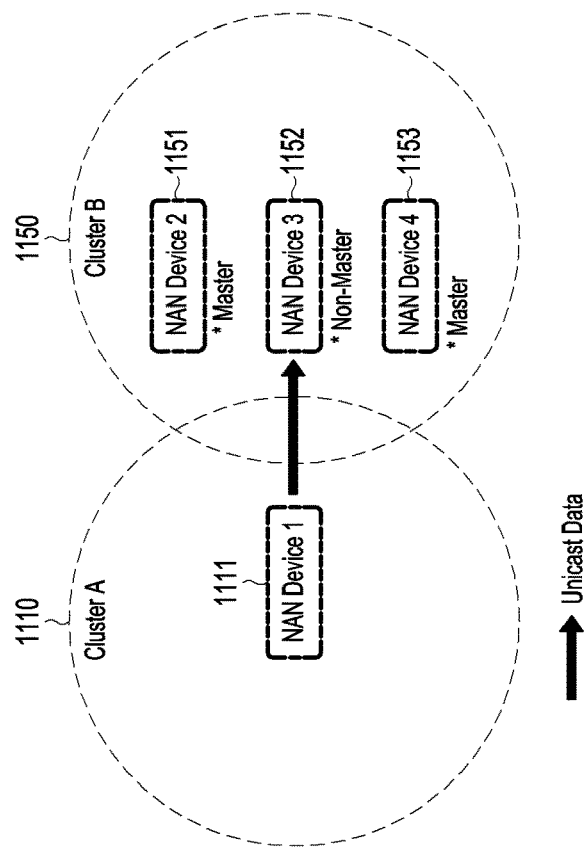
FIGS. 11A and 11B are illustrations of a method for selecting a mesh data path for propagating an SDF according to an embodiment.
Figure 11A:
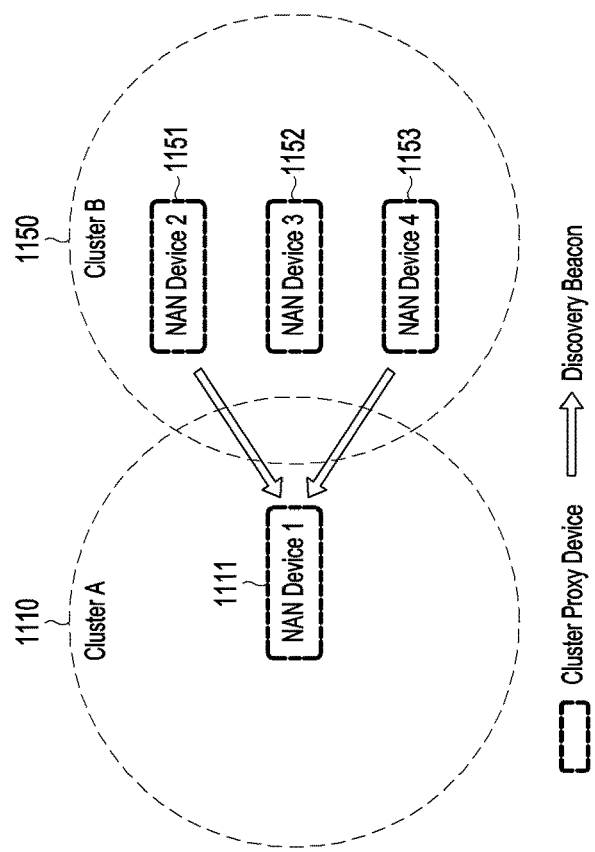

FIGS. 11A and 11B are illustrations of a method for selecting a mesh data path for propagating an SDF according to an embodiment.

Referring to FIG. 11A, NAN device 1 1111, which is a cluster proxy device of cluster A 1110—in order to propagate service-related data to cluster B 1150—may rank the NAN devices 2, 3, and 4, 1151, 1152, and 1153, respectively, of cluster B 1150 based on data throughputs and prioritize NAN devices with smaller data throughputs. Thus, NAN device 1 1111 selects the NAN device with the highest priority as the representative cluster proxy device of cluster B 1150 and unicasts service-related data to the representative cluster proxy device of cluster B 1150.

For example, NAN device 1 1111 of cluster A 1110 may select a cluster proxy device, which does not serve as a master, from among the NAN devices 2, 3, and 4 1151, 1152, and 1153, respectively, of cluster B 1150, as the representative cluster proxy device and unicast service-related data to the representative cluster proxy device of cluster B 1150.

Before transmitting service-related data, NAN device 1 1151 of cluster A 1110 receives discovery beacons from NAN device 2 1151 and NAN device 4 1153 among NAN device 2 1151, NAN device 3 1152, and NAN device 4 1153 which are the cluster proxy devices of cluster B 1150. By receiving the discovery beacons from NAN device 2 1151 and NAN device 4 1153, NAN device 1 1111 may identify that NAN device 2 1151 and NAN device 4 1153 are playing as masters in cluster B 1150.

Referring to FIG. 11B, NAN device 1 1111 may select NAN device 3 1152, a non-master NAN device, except for NAN device 2 1151 and NAN device 4 1153 which are serving as masters, as the representative cluster proxy device and unicasts service-related data.

The master NAN devices process a plenty of data—thus consuming more power than non-master NAN devices do—and their propagation may slow down due to their limited capability. Accordingly, NAN device 1 1111 of cluster A may set the NAN device with a relatively smaller data throughput as the representative cluster proxy device of cluster B 1150 and transmit service-related data.

Figure 12:
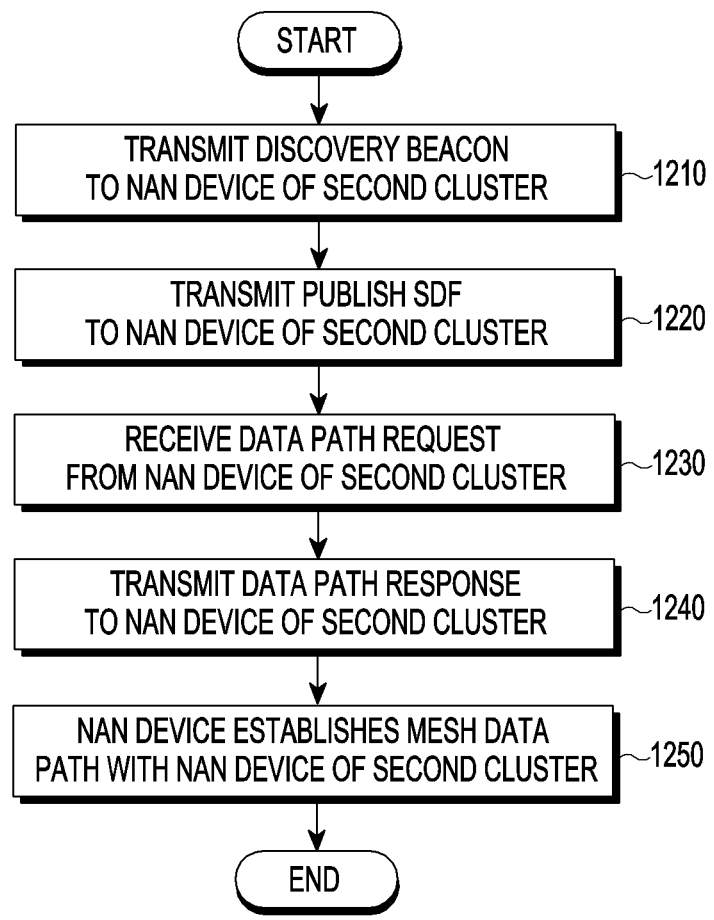
FIG. 12 is a flowchart of an order of establishing an inter-cluster NAN mesh by transmitting a publish SDF according to an embodiment.

FIG. 12 is a flowchart of an order of establishing an inter-cluster NAN mesh by transmitting a publish SDF according to an embodiment.

Referring to FIG. 12, a NAN device transmits a discovery beacon to a NAN device of a second cluster at step 1210. The NAN device may notify a NAN device of a second cluster of its presence through a discovery beacon.

The NAN device transmits a publish SDF to the NAN device of the second cluster at step 1220. The NAN device may send the name of the service that it offers and detailed information related to the service to the NAN device of the second cluster through the publish SDF.

The NAN device receives a data path request from the NAN device of the second cluster at step 1230. The data path request is a message for requesting to establish a mesh data path between the NAN device and the NAN device of the second cluster.

In response to the data path request, the NAN device transmits a data path response to the NAN device of the second cluster at step 1240. The data path response is a message for indicating to accept or reject the request for establishing a mesh data path between the NAN device and the NAN device of the second cluster.

Where the data path response indicates accepting, a mesh data path is established between the NAN device and the NAN device of the second cluster at step 1250. Accordingly, the NAN device may provide services to NAN devices of other clusters than the cluster where the NAN device belongs. Further, the NAN device of the second cluster may receive services from NAN devices of other clusters than the cluster where it belongs.

Conversely, where the data path response indicates a rejection, no mesh data path may be established between the NAN device and the NAN device of the second cluster. In this case, the data path response may contain a reason code. The NAN device of the second cluster which receives the data path response may stop or reattempt to send a data path request according to the reason code.

Figure 13:
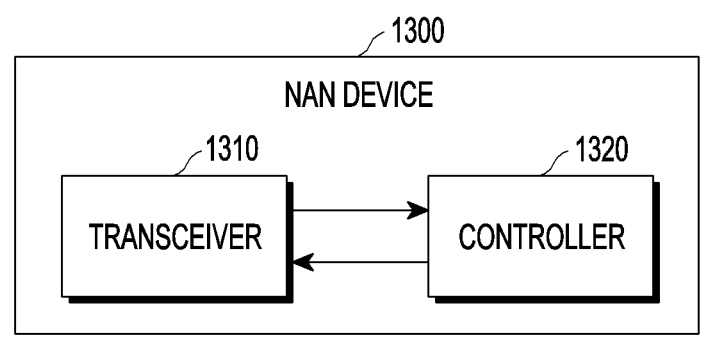
FIG. 13 is a block diagram of a NAN device transmitting a publish SDF according to an embodiment.

FIG. 13 is a block diagram of a NAN device transmitting a publish SDF according to an embodiment.

Referring to FIG. 13, a NAN device 1300 transmitting a publish SDF includes a transceiver 1310 and a controller 1320.

The transceiver 1310 transmits a discovery beacon and a publish SDF to a NAN device of a second cluster.

The transceiver 1310 receives a data path request from the NAN device of the second cluster and in response to the data path request transmits a data path response to the NAN device of the second cluster.

The controller 1320 establishes a mesh data path with the NAN device of the second cluster.

Figure 14:
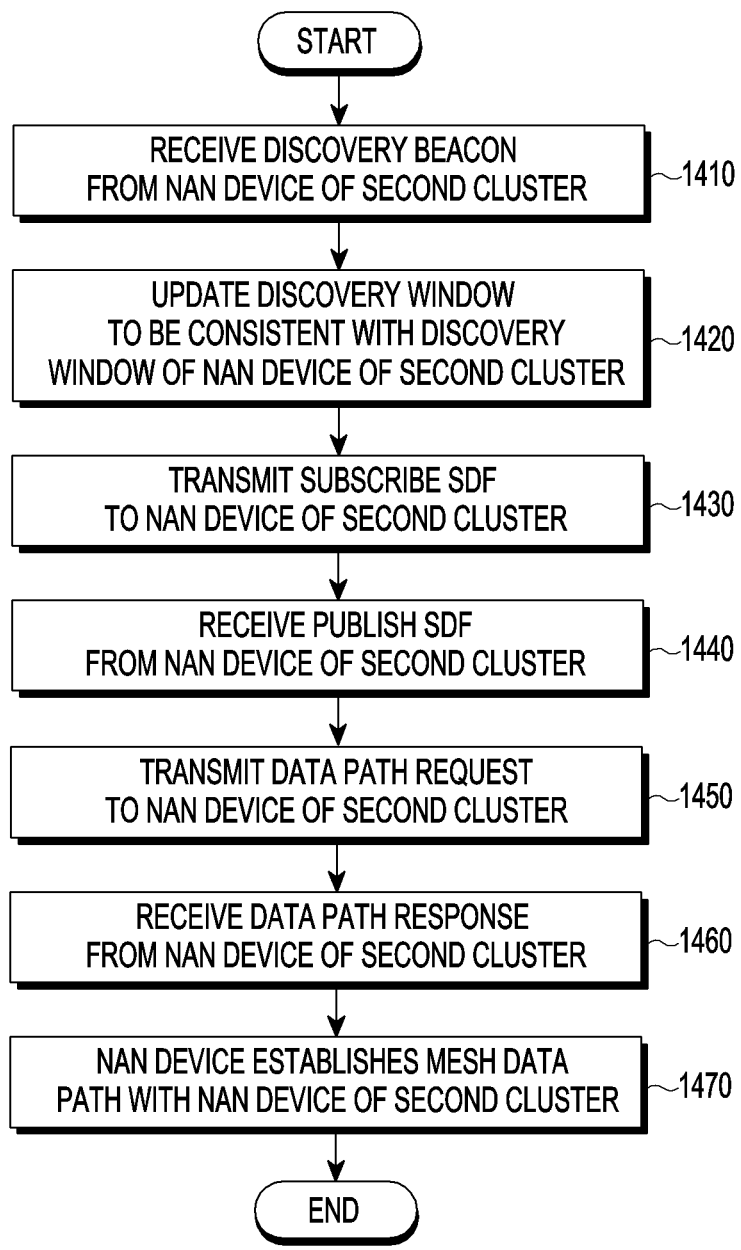
FIG. 14 is a flowchart of a method of establishing an inter-cluster NAN mesh by transmitting a subscribe SDF according to an embodiment.

FIG. 14 is a flowchart of an order of establishing an inter-cluster NAN mesh by transmitting a subscribe SDF according to an embodiment.

For example, FIG. 14 illustrates operations of a NAN device when it is required to form a mesh data path with a neighbor cluster. In this case, the NAN device may indicate all of the displays included in a cluster or one or multiple particular devices.

Referring to FIG. 14, the NAN device receives a discovery beacon from a NAN device of a second cluster at step 1410. The NAN device may recognize the presence of the NAN device of the second cluster through the discovery beacon.

The NAN device updates its discovery window to equal the discovery window of a NAN device of a second cluster, which is contained in the discovery beacon, based on a schedule for the discovery window, i.e., channel active period, of the NAN device of the second cluster at step 1420. The NAN device may determine whether the NAN device of the second cluster is an undiscovered device. For example, the NAN device may determine whether the NAN device of the second cluster is an undiscovered device based on the medium access control (MAC) address of the NAN device of the second cluster. The NAN device transmits a subscribe SDF to the NAN device of the second cluster at step 1430. The NAN device may notify the NAN device of the second cluster of a service that it desires to receive through the subscribe SDF.

The NAN device receives a publish SDF from the NAN device of the second cluster at step 1440. The NAN device may recognize, through the publish SDF, that it can receive its desired service from the NAN device of the second cluster.

The NAN device transmits a data path request to the NAN device of the second cluster at step 1450.

The NAN device receives a data path response from the NAN device of the second cluster at step 1460.

As the NAN device receives the data path response from the NAN device of the second cluster, a mesh data path is established between the NAN device and the NAN device of the second cluster at step 1470. The data path response indicates to accept the data path request. Accordingly, the NAN device may receive services from NAN devices of other clusters than the cluster where it belongs.

Where the data path response indicates rejecting, no mesh data path may be established between the NAN device and the NAN device of the second cluster. In this case, the data path response may contain a reason code. The NAN device may stop or reattempt to send a data path request according to the reason code.

Figure 15:
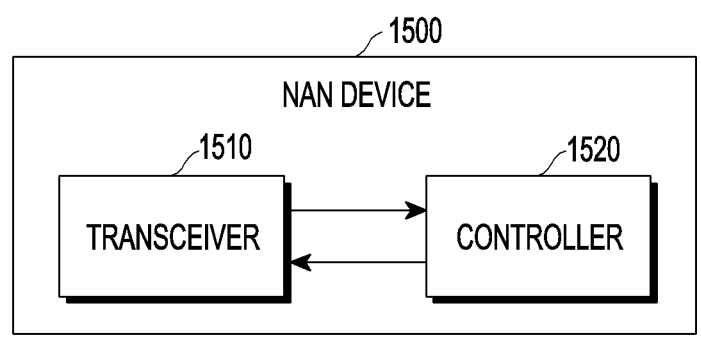
FIG. 15 is a block diagram of a configuration of a NAN device transmitting a subscribe SDF according to an embodiment.

FIG. 15 is a block diagram of a NAN device transmitting a subscribe SDF according to an embodiment.

Referring to FIG. 15, a NAN device 1500 transmitting a subscribe SDF includes a transceiver 1510 and a controller 1520.

The transceiver 1510 receives a discovery beacon from a NAN device of a second cluster and transmits a subscribe SDF to the NAN device of the second cluster.

Further, the transceiver 1510 receives a publish SDF from the NAN device of the second cluster and transmits a data path request to the NAN device of the second cluster. The transceiver 1510 receives a data path response, which is responsive to the data path request, from the NAN device of the second cluster.

The controller 1520 updates its discovery window to equal the discovery window of the NAN device of the second cluster, which is contained in the discovery beacon, based on a schedule for the discovery window of the NAN device of the second cluster. The controller 620 establishes a mesh data path with the NAN device of the second cluster.

Figure 16A:
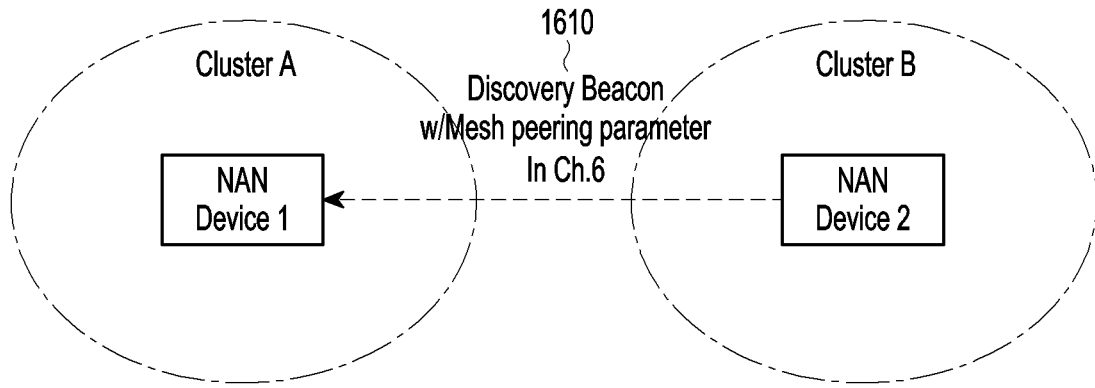
FIGS. 16A, 16B, and 16C are illustrations of a first scheme for establishing an inter-cluster NAN mesh data path based on NAN mesh according to an embodiment.
Figure 16B:
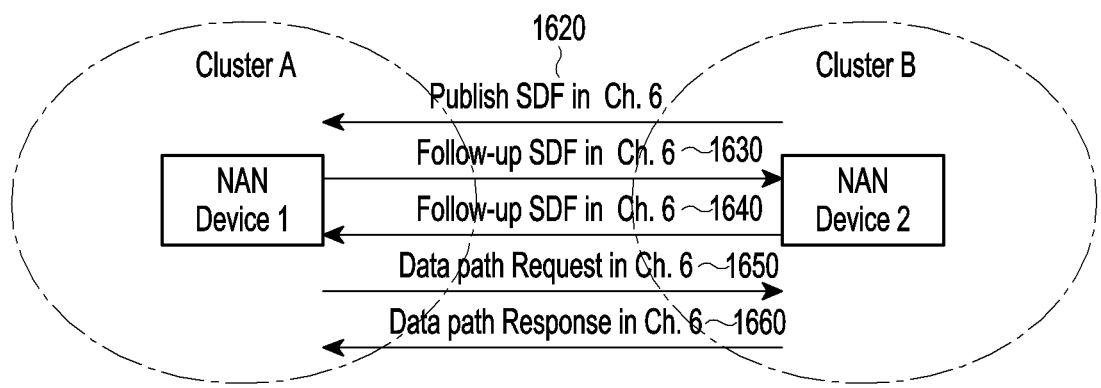
Figure 16C:
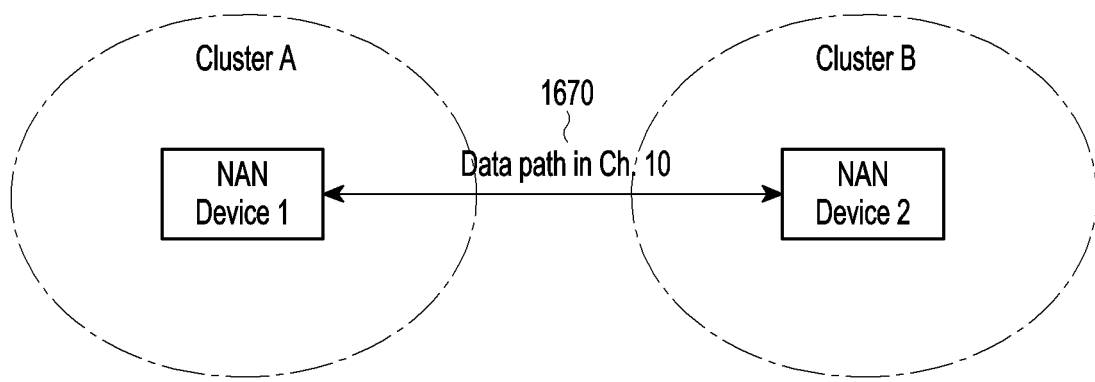
Figure 17A:
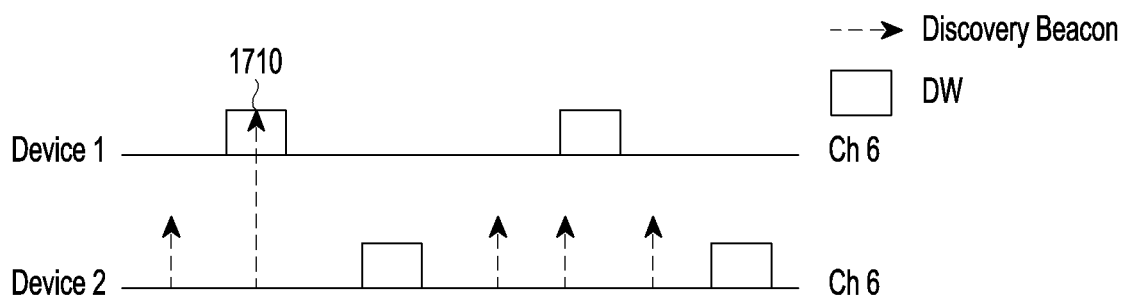
FIGS. 17A, 17B, and 17C are illustrations of channels of NAN device 1 of cluster A and NAN device 2 of cluster B according to a first scheme according to an embodiment.
Figure 17B:
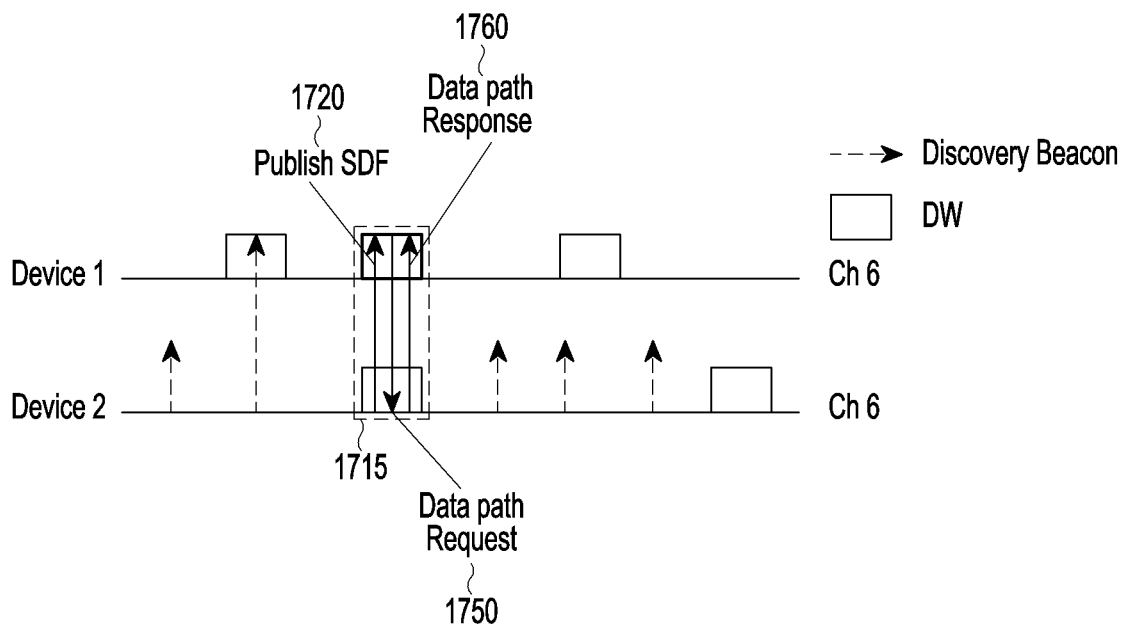
Figure 17C:
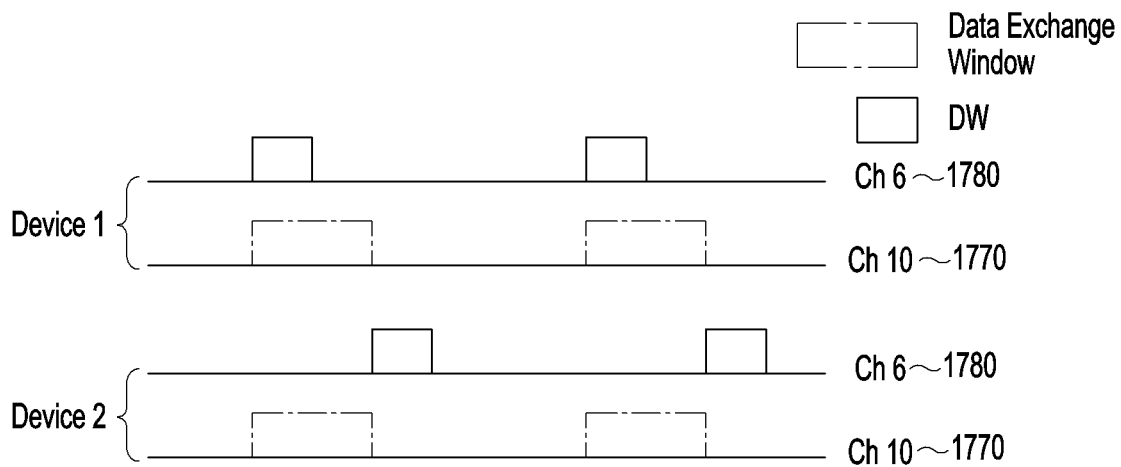

FIGS. 16A, 16B, and 16C are illustrations of a first scheme for establishing an inter-cluster NAN mesh data path based on NAN mesh according to an embodiment. FIGS. 17A, 17B, and 17C are illustrations of channels of NAN device 1 of cluster A and NAN device 2 of cluster B according to a first scheme according to an embodiment.

Devices of cluster A form a NAN mesh network, and devices of cluster B form a NAN mesh network.

Referring to FIG. 16A, NAN device 2 of cluster B transmits a discovery beacon on channel 6 at step 1610. In this case, the discovery beacon contains the cluster ID of NAN device 2, discovery window information about NAN device 2, and mesh peering capability information about NAN device 2. The discovery window information means information about the schedule of the discovery window, e.g., an active period (or wake-up period) and an inactive period (or sleep period). The mesh peering capability information may be indicated as a mesh peering parameter value. For example, where the value is 1, this may indicate that NAN device 2 is capable of NAN mesh peering, and otherwise, the value may be set to 0. Here, NAN mesh peering refers to setting up a NAN mesh data path and updating the mesh parameters. The NAN mesh data path setup and mesh parameters are described below in detail.

NAN device 1 of cluster A receives a discovery beacon from NAN device 2 of cluster 2 on channel 6.

Referring to FIG. 17A, NAN device 1 only receives the discovery beacon within the active period, i.e., discovery window, of NAN device 1 at step 1710.

Where the mesh peering parameter of the received discovery beacon is 1, NAN device 1 of cluster A identifies whether a NAN mesh data path has already been formed with NAN device 2 of cluster B.

Where a NAN mesh data path has yet to be formed with NAN device 2 of cluster B, NAN device 1 of cluster A schedules the discovery window of NAN device 1 based on the discovery window information about NAN device 2 of cluster B which is contained in the received discovery beacon.

Referring to FIG. 17B, NAN device 1 of cluster A activates channel 6 at the same time as the discovery window of NAN device 2 of cluster B and schedules to deactivate at the same time at step 1715. For the purpose of NAN mesh peering, NAN device 1 of cluster A schedules the discovery window of NAN device 1 to be the same as the discovery window of NAN device 2. Performing NAN mesh peering requires the receipt of a publish SDF from NAN device 2 of cluster B. Only when channel 6 of NAN device 1 of cluster A is active, NAN device 1 may receive a publish SDF from NAN device 2.

Referring to FIG. 16B, NAN device 2 of cluster B notifies NAN device 1 of cluster A that inter-cluster NAN mesh peering is possible on channel 6 through the publish SDF at step 1620. In other words, NAN device 1 of cluster A receives the publish SDF on channel 6.

Referring to FIG. 17B, NAN device 1 of cluster A receives a publish SDF within the same discovery window 1715 as that of NAN device 2 of cluster B at step 1720.

NAN device 1 of cluster A identifies the mesh parameters contained in the publish SDF. In this case, the mesh parameters contain the mesh ID for identifying the NAN mesh network, the synchronization method to indicate a sync scheme between the NAN mesh devices, the authentication protocol to indicate an authentication protocol used in the SDF, which is a management frame, the path selection protocol identifier to indicate a protocol to select a NAN mesh data path, and the path metric identifier to indicate a link metric for selecting a NAN mesh data path.

NAN device 1 of cluster A may update the mesh parameters through the publish SDF. For example, there may be a plurality of authentication protocols that are selectable by NAN device 1 of cluster A and NAN device 2 of cluster B. Accordingly, NAN device 1 of cluster A may update the authentication protocol contained in its own mesh parameters to the authentication protocol contained in the mesh parameters in the publish SDF.

Referring to FIG. 16B, upon determining to require additional information to set up NAN mesh peering, NAN device 1 of cluster A may transmit a follow-up SDF to NAN device 2 of cluster B on channel 6 at step 1630. The follow-up SDF may be an additional information request message for setting up NAN mesh peering.

In response to an additional information request for setting up NAN mesh peering, NAN device 2 of cluster B may transmit additional information necessary to set up NAN mesh peering to NAN device 1 of cluster A through the follow-up SDF at step 1640.

Upon determining that a NAN mesh can be configured based on the mesh parameters contained in the publish SDF and the additional information contained in the follow-up SDF, NAN device 1 of cluster A transmits a data path request to NAN device 2 of cluster B at step 1650. The data path request includes channel information to set up a NAN mesh data path and a schedule of an active period, i.e., data exchange window, on the channel to set up the NAN mesh data path.

In response to the data path request, NAN device 2 of cluster B transmits a data path response to NAN device 1 of cluster A to indicate accepting to establish a NAN mesh data path at step 1660.

Referring to FIG. 17B, NAN device 1 of cluster A transmits the data path request within the same discovery window 1715 as that of NAN device 2 of cluster B at step 1750. Further, NAN device 2 of cluster B transmits the data path response within the same discovery window 1715 as that of NAN device 1 of cluster A at step 1760. The data path request and the data path response may be transmitted and received within the same discovery window 1715 as the discovery window during which the publish SDF is transmitted and received.

Referring to FIG. 16C, a NAN mesh data path is established on channel 10 between NAN device 1 of cluster A and NAN device 2 of cluster B at step 1670. Accordingly, NAN device 1 of cluster A and NAN device 2 of cluster B may exchange data through the NAN mesh data path.

Referring to FIG. 17C, the NAN mesh data path is set up on channel 10, and data exchange windows that are the same are scheduled on channel 10's of NAN device 1 of cluster A and NAN device 2 of cluster B at step 1770. Conversely, channel 6 of NAN device 1 of cluster A which is scheduled to be the same as the discovery window of channel 6 of NAN device 2 of cluster B for NAN mesh peering is reset to the setting of cluster A at step 1780. That is, channel 6 of NAN device 1 of cluster A is reset to the schedule for the discovery window of the time that the discovery beacon is received from NAN device 2 of cluster B.

In an embodiment, where cluster A has a plurality of NAN devices, the plurality of NAN devices may stay connected with each other. At this time, only one or some of the plurality of NAN devices may form mesh data paths with the NAN device of cluster B. Further, all of the plurality of NAN devices may establish mesh data paths with the NAN device of cluster B.

For example, where cluster B has a plurality of NAN devices, the NAN device of cluster A may schedule different active periods, i.e., data exchange widows, for the plurality of NAN devices and may multiplex and multicast data to the plurality of NAN devices.

Figure 18A:
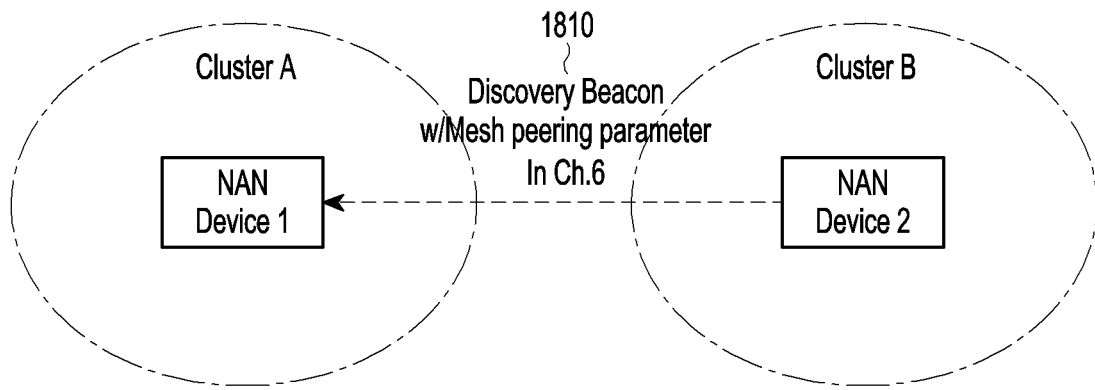
FIGS. 18A, 18B, and 18C are illustrations of a second scheme for establishing an inter-cluster NAN mesh data path based on NAN mesh according to an embodiment.
Figure 18B:
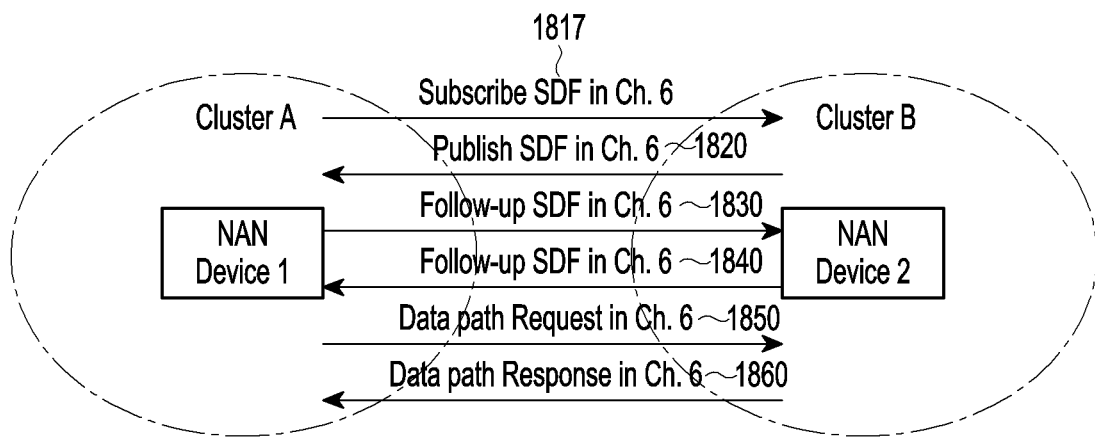
Figure 18C:
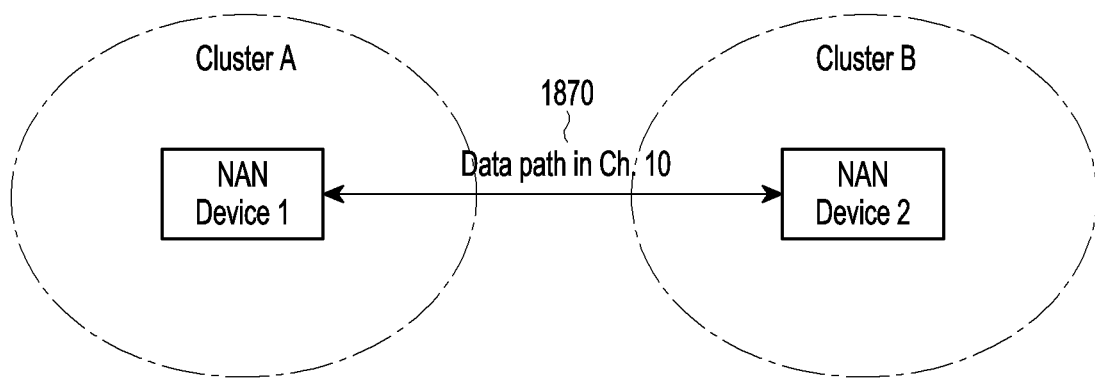

FIGS. 18A, 18B, 18C are illustrations of a second scheme for establishing an inter-cluster NAN mesh data path based on NAN mesh according to an embodiment. FIGS. 19A, 19B, and 19C are illustrations of channels of NAN device 1 of cluster A and NAN device 2 of cluster B according to a second scheme according to an embodiment.

Steps 1810, 1830, 1840, 1850, 1860, and 1870 of FIGS. 18A, 18B, and 18C are the same as steps 1610, 1630, 1640, 1650, 1660, and 1670 of FIGS. 16A, 16B, and 16C, respectively, and no description thereof is thus presented below.

Steps 1910, 1915, 1920, 1950, 1960, 1970, and 1980 of FIGS. 19A, 19B, and 19C are the same as steps 1710, 1715, 1720, 1750, 1760, 1770, and 1780 of FIGS. 17A, 17B, and 17C, respectively, and no description thereof is thus presented below.

Referring to FIG. 18B, NAN device 1 of cluster A, after receiving a discovery beacon, may transmit a subscribe SDF to NAN device 2 of cluster B on channel 6 at step 1817. In this case, the subscribe SDF may contain mesh parameters of NAN device 1 of cluster A. By including the mesh parameters, the subscribe SDF may send a request for a device that supports mesh peering.

By receiving the subscribe SDF, NAN device 2 of cluster B may determine its mesh parameters based on the mesh parameters contained in the subscribe SDF and include them in a publish SDF. Thus, the determined mesh parameters of NAN device 2 of cluster B may be included in the publish SDF and transmitted to NAN device 1 of cluster A at step 1820.

Referring to FIG. 19B, NAN device 1 of cluster A transmits a subscribe SDF in the same discovery window 1915 as that of NAN device 2 of cluster B at step 1917.

Certain embodiments of the present disclosure may be implemented as computer readable code in a non-transitory computer readable recording medium. The non-transitory computer readable recording medium is a data storage device that may store data readable by a computer system. Examples of the computer readable recording medium may include read only memories (ROMs), random access memories (RAMs), compact disc ROMs (CD-ROMs), magnetic tapes, floppy disks, optical data storage devices, and carrier waves (such as data transmission over the Internet). The non-transitory computer readable recording medium may be distributed by computer systems over a network, and accordingly, the computer readable code may be stored and executed in a distributed manner. Functional programs, code, and code segments to attain various embodiments of the disclosure may be readily interpreted by skilled programmers in the art to which the present disclosure pertains.

The apparatuses and methods according to embodiments of the present disclosure may be implemented in hardware, software, or a combination of hardware and software. Such software may be stored in a volatile or non-volatile storage device such as a ROM or other storage devices, a memory, such as a RAM, a memory integrated circuit or chip, a device or an integrated circuit, or a storage medium, such as, e.g., a CD, a digital video disc (DVD), a magnetic disk, or a magnetic tape, which allows for optical or magnetic recording while simultaneously read out by a machine (e.g., a computer). The methods according to embodiments of the present disclosure may be implemented by a computer or a portable terminal including a controller and a memory, and the memory may be a non-transitory machine-readable storage medium that may properly retain program(s) containing instructions for implementing the embodiments of the disclosure.

Accordingly, embodiments of the present disclosure encompass a program containing code for implementing the device or method set forth in the appended claims of the present disclosure and a non-transitory machine (e.g., computer)-readable storage medium storing the program. The program may be electronically transferred via any media such as communication signals transmitted through a wired or wireless connection and embodiments of the disclosure properly includes the equivalents thereof.

The apparatuses according to embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

The embodiments herein are provided merely for better understanding of the present disclosure, and the present disclosure is not intended to be limited thereto or thereby. The embodiments set forth herein are merely examples, and it will be apparent to one of ordinary skill in the art that various changes may be made thereto without departing from the scope of the present disclosure as defined by the appended claims and their equivalents.

What is claimed is:

1. A method for transmitting and receiving data between a first cluster and a second cluster by a first device of the first cluster, the method comprising:
    transmitting, to a second device of the second cluster, a beacon including information related to an active period on a channel of the first cluster during an inactive period on the channel of the first cluster;
    transmitting, to the second device of the second cluster, a frame including information related to services that devices of the first cluster provide during the active period on the channel of the first cluster;
    receiving, from the second device of the second cluster, a data path setup request including information related to a data channel for a data path; and
    transmitting, to the second device of the second cluster, a data path setup response in response to the data path setup request,
    wherein an active period on a data channel of the second cluster and an active period on a data channel of the first cluster are synchronized based on the data path setup request.

2. The method of claim 1, further comprising receiving, from the second device of the second cluster, a message including information related to a service that the second device is to receive.

3. The method of claim 1, further comprising:
    when data paths are established with devices of the second cluster, selecting at least one device from among the devices of the second cluster based on mobility of each of the devices; and
    transmitting, to the second device of the second cluster, the data through the selected at least one device.

4. The method of claim 1, further comprising:
    when data paths are established with the devices of the second cluster, selecting at least one device from among the devices of the second cluster based on a data throughput of each of the devices; and
    transmitting, to the second device of the second cluster, the data through the selected at least one device.

5. The method of claim 1, further comprising:
    when data paths are established with devices of the second cluster, selecting at least one device from among the devices of the second cluster in a predetermined order; and transmitting, to the second device of the second cluster, the data through the selected at least one device.

6. The method of claim 1, wherein the beacon further includes information related to a capability of establishing the data path.

7. The method of claim 1, wherein the first device of the first cluster is a cluster proxy device of the second cluster.

8. The method of claim 1, wherein the frame further includes information about whether a data path is established with a third cluster.

9. The method of claim 1, wherein the frame further includes information related to a range where the data can transmit.

10. The method of claim 1, further comprising transmitting, to the second device, a message including information related to a data path setup-related parameter of the first device of the first cluster,
wherein a data path setup-related parameter of the second device is updated based on the data path setup-related parameter of the first device of the first cluster.

11. A method for transmitting and receiving data between a first cluster and a second cluster by a second device of the second cluster, the method comprising:
receiving, from a first device of the first cluster, a beacon including information related to an active period on a channel of the first cluster during an inactive period on the channel of the first cluster;
receiving, from the first device of the first cluster, a frame including information related to services that devices of the first cluster provide during the active period on the channel of the first cluster;
transmitting, to the first device of the first cluster, a data path setup request including information related to a data channel for a data path; and
receiving, from the first device of the first cluster, a data path setup response in response to the data path setup request,
wherein an active period on a data channel of the second cluster and an active period on a data channel of the first cluster are synchronized based on the data path setup request.

12. The method of claim 11, further comprising transmitting, to the first device of the first cluster, a message including information related to a service that the second device is to receive.

13. The method of claim 11, further comprising receiving, from the first device of the first cluster, the data through the selected at least one device, when data paths are established between the first device of the first cluster and devices of the second cluster based on mobility of each of the devices.

14. The method of claim 11, further comprising receiving, from the first device of the first cluster, the data through the selected at least one device, when data paths are established between the first device of the first cluster and devices of the second cluster based on data throughput of each of the devices.

15. The method of claim 11, further comprising receiving, from the first device of the first cluster, the data through the selected at least one device, when data paths are established between the first device and devices of the second cluster in a predetermined order.

16. The method of claim 11, wherein the beacon further includes information related to a capability of establishing the data path.

17. The method of claim 11, wherein the frame further includes information about whether a data path is established with a third cluster.

18. The method of claim 11, further comprising:
receiving, from the first device of the first cluster, a message including information related to a data path setup-related parameter of the first device; and
updating a data path setup-related parameter of the second device based on the data path setup-related parameter of the first device.

19. A first device of a first cluster, wherein the first device is configured to transmit and receive data between the first cluster and a second cluster and comprises:
a transceiver; and
a controller coupled to the transceiver, wherein the controller is configured to:
transmit, to a second device of the second cluster, a beacon including information related to an active period on a channel of the first cluster during an inactive period on the channel of the first cluster,
transmit, to the second device of the second cluster, a frame including information related to services that devices of the first cluster provide during the active period on the channel of the first cluster,
receive, from the second device of the second cluster, a data path setup request including information related to a data channel for a data path, and
transmit, to the second device, a data path setup response in response to the data path setup request,
wherein an active period on a data channel of the second cluster and an active period on a data channel of the first cluster are synchronized based on the data path setup request.

20. A second device of a second cluster, wherein the second device is configured to transmit and receive data between a first cluster and the second cluster and comprises:
a transceiver; and
a controller coupled to the transceiver, wherein the controller is configured to:
receive, from a first device of the first cluster, a beacon including information related to an active period on a channel of the first cluster during an inactive period on the channel of the first cluster,
receive, from the first device of the first cluster, a frame including information related to services that devices of the first cluster provide during the active period on the channel of the first cluster,
transmit, to the first device of the first cluster, a data path setup request including information related to a data channel for a data path, and
receive, from the first device of the first cluster, a data path setup response in response to the data path setup request,
wherein an active period on a data channel of the second cluster and an active period on a data channel of the first cluster are synchronized based on the data path setup request.

* * * * *